(12) United States Patent
Irvine et al.

(10) Patent No.: US 11,672,236 B2
(45) Date of Patent: Jun. 13, 2023

(54) FEED INTAKE SYSTEM

(71) Applicants: John Irvine, Manhattan, KS (US); Bernard Irvine, Manhattan, KS (US)

(72) Inventors: John Irvine, Manhattan, KS (US); Bernard Irvine, Manhattan, KS (US)

( * ) Notice: Subject to any disclaimer, the term of this patent is extended or adjusted under 35 U.S.C. 154(b) by 0 days.

(21) Appl. No.: 16/995,280

(22) Filed: Aug. 17, 2020

(65) Prior Publication Data

US 2021/0307297 A1    Oct. 7, 2021

Related U.S. Application Data

(60) Provisional application No. 62/887,890, filed on Aug. 16, 2019.

(51) Int. Cl.

| | | |
|---|---|---|
| *A01K 1/00* | (2006.01) | |
| *A01K 29/00* | (2006.01) | |
| *A01K 5/01* | (2006.01) | |
| *A01K 11/00* | (2006.01) | |
| *G01G 19/414* | (2006.01) | |
| *G01G 21/23* | (2006.01) | |

(52) U.S. Cl.
CPC .......... *A01K 29/005* (2013.01); *A01K 1/0023* (2013.01); *A01K 5/01* (2013.01); *A01K 11/006* (2013.01); *G01G 19/414* (2013.01); *G01G 21/23* (2013.01)

(58) Field of Classification Search
CPC .......... A01K 1/0023; A01K 5/00; A01K 5/01; A01K 5/0283; A01K 29/005; A01K 11/006
See application file for complete search history.

(56) References Cited

U.S. PATENT DOCUMENTS

| | | | | |
|---|---|---|---|---|
| 2009/0301405 A1* | 12/2009 | Wurtz | .................... | A01K 29/00 119/842 |
| 2015/0237825 A1* | 8/2015 | Fallis | ....................... | A01K 5/02 |
| 2019/0387718 A1* | 12/2019 | Brown | ................. | A01K 39/012 |
| 2021/0007330 A1* | 1/2021 | Huisma | .................. | A01K 29/00 |

* cited by examiner

*Primary Examiner* — Joshua E Rodden
*Assistant Examiner* — Henry Hooper Mudd
(74) *Attorney, Agent, or Firm* — Blake E. Vande Garde; Avek IP, LLC

(57) ABSTRACT

A feed intake system comprising one or more feeding stations comprising a trough with an animal feeding access, a support frame surrounding the trough, a base frame supporting the trough, a scale unit between the base frame and the support frame enabling the scale unit to weigh the contents of the trough, a station frame with an animal feeding access, a sensor assembly including a sensor or antenna located near the station frame animal feeding access, a control panel and a timestamp generator operationally associated with the sensor assembly and the scale unit, a CPU/processing computer operationally associated with the control panel, one or more animals, each having a RFID tag which transmits RFID signal and tag data, wherein the weight of the feed in the trough is collected and stored in a log file and wherein RFID signal and tag data are collected and stored in a log file.

20 Claims, 17 Drawing Sheets

FEED INTAKE SYSTEM

FIELD OF INVENTION

The present invention pertains generally to livestock management and, more specifically, to the monitoring nutritional intake and behavior of livestock on an individual animal level.

BACKGROUND OF THE INVENTION

The monitoring, collection, tabulation and visualization of nutritional intake in livestock housed in group pens has been an arduous if not impossible task. There has been a long-standing need for a system and method for collecting and tabulating the amount of feed each individual animal consumes in addition to the type and quality of feed to better understand, facilitate and maintain the health and efficiency of livestock.

Nutritional intake is the most expensive element in livestock development. Hence, ranchers and farmers looking to control costs must monitor the consumption by each individual animal in an attempt to maximize that animal's production whether that production being putting on weight/growth or dairy output. Additionally, if an animal's nutritional intake decreases, it may indicate symptoms of illness or disease which can be remedied to restore profitability. It may also indicate behavior such as more-dominant animals keeping less-dominant animals from obtaining the nutrition that would best benefit them.

Prior systems were designed to capture individual animal feed intake, with many subsequently discarded due of lack of accuracy or the requirement of a high degree of human labor to operate. Other more recent systems rely heavily upon obsolete technology or utilization of statistical estimation to "calculate" weights that occur as a result of design flaws.

Technology has evolved to the point where microelectronics, computer processing capability, RFID technology and battery life allow for a system to accurately monitor, differentiate and record the nutritional intake of individual animals. Thus, there is clearly a need for a livestock feed intake system which addresses these issues.

SUMMARY OF THE INVENTION

A feed intake system comprising one or more feeding stations comprising a trough with an animal feeding access, a support frame surrounding the trough, a base frame supporting the trough, a scale unit between the base frame and the support frame enabling the scale unit to weigh the contents of the trough, a station frame with an animal feeding access, a sensor assembly including a sensor or antenna located near the station frame animal feeding access, a control panel and a timestamp generator operationally associated with the sensor assembly and the scale unit, a CPU/processing computer operationally associated with the control panel, one or more animals, each having a RFID tag which transmits RFID signal and tag data, wherein the weight of the feed in the trough is collected and stored in a log file and wherein RFID signal and tag data are collected and stored in a log file.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
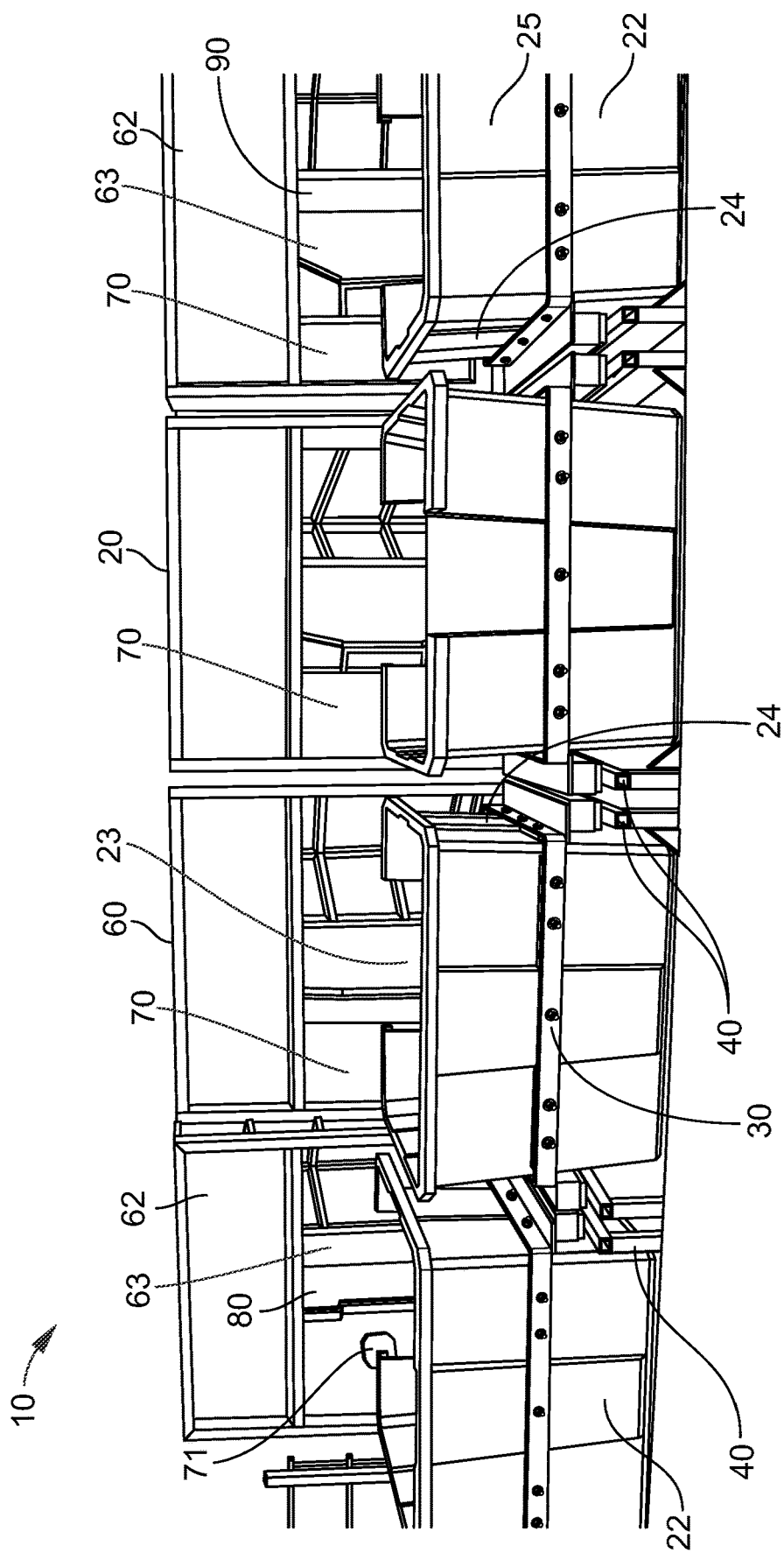
FIG. 1 is a back proximal view of one embodiment of the instant invention.
Figure 2:
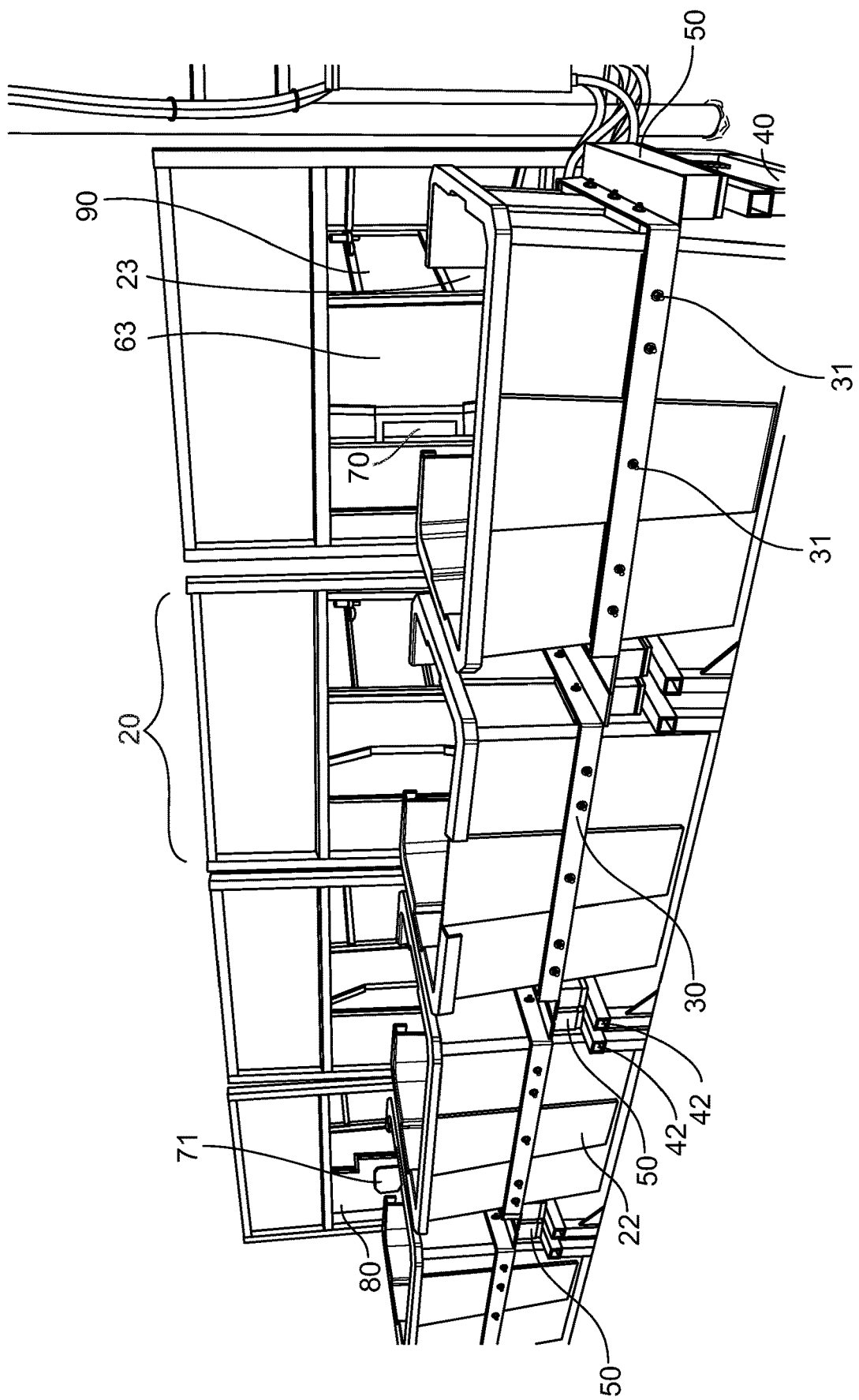
FIG. 2 is a back proximal view of one embodiment of the instant invention.
Figure 3:
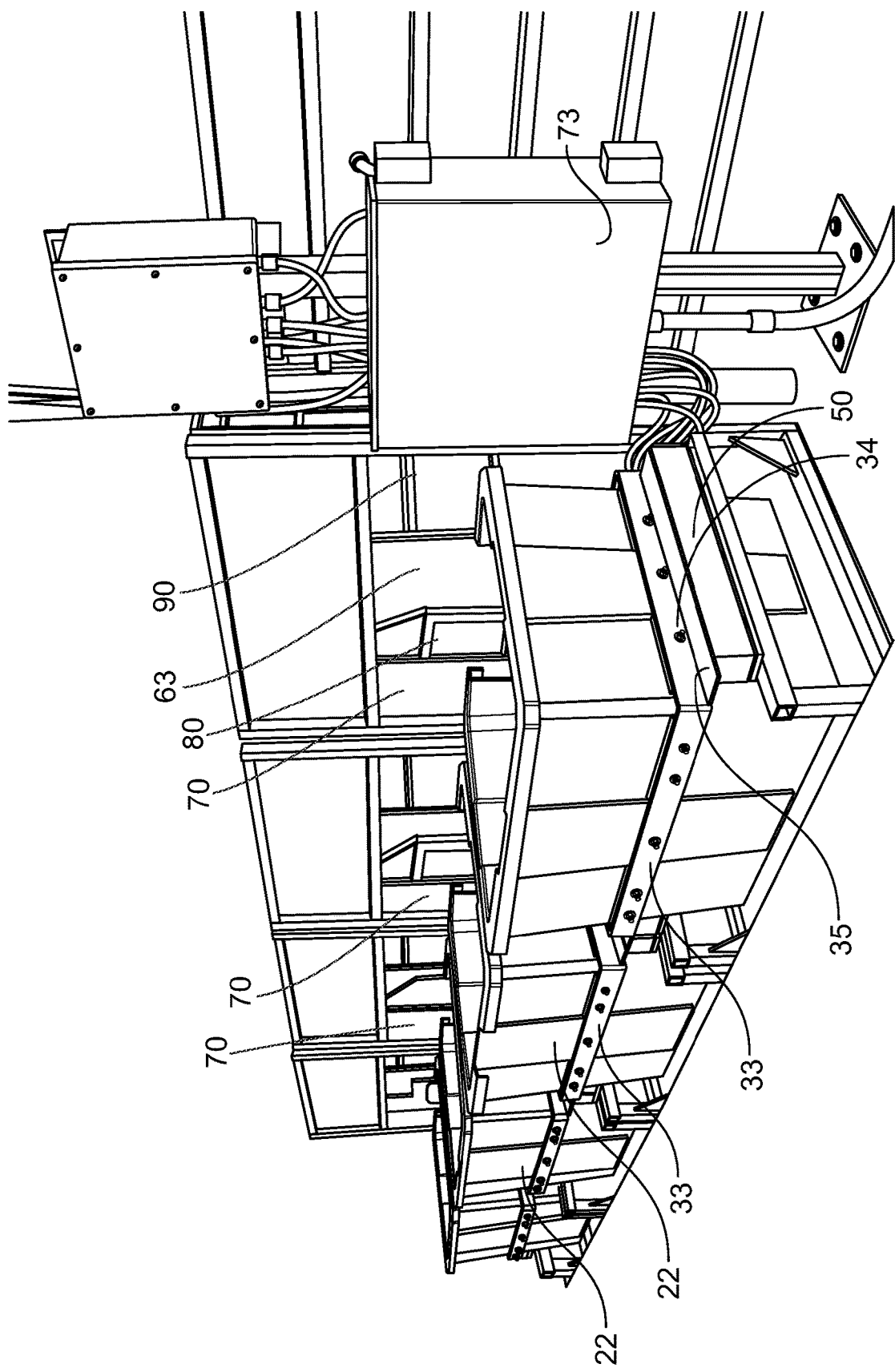
FIG. 3 is a side proximal view of one embodiment of the instant invention.
Figure 4:
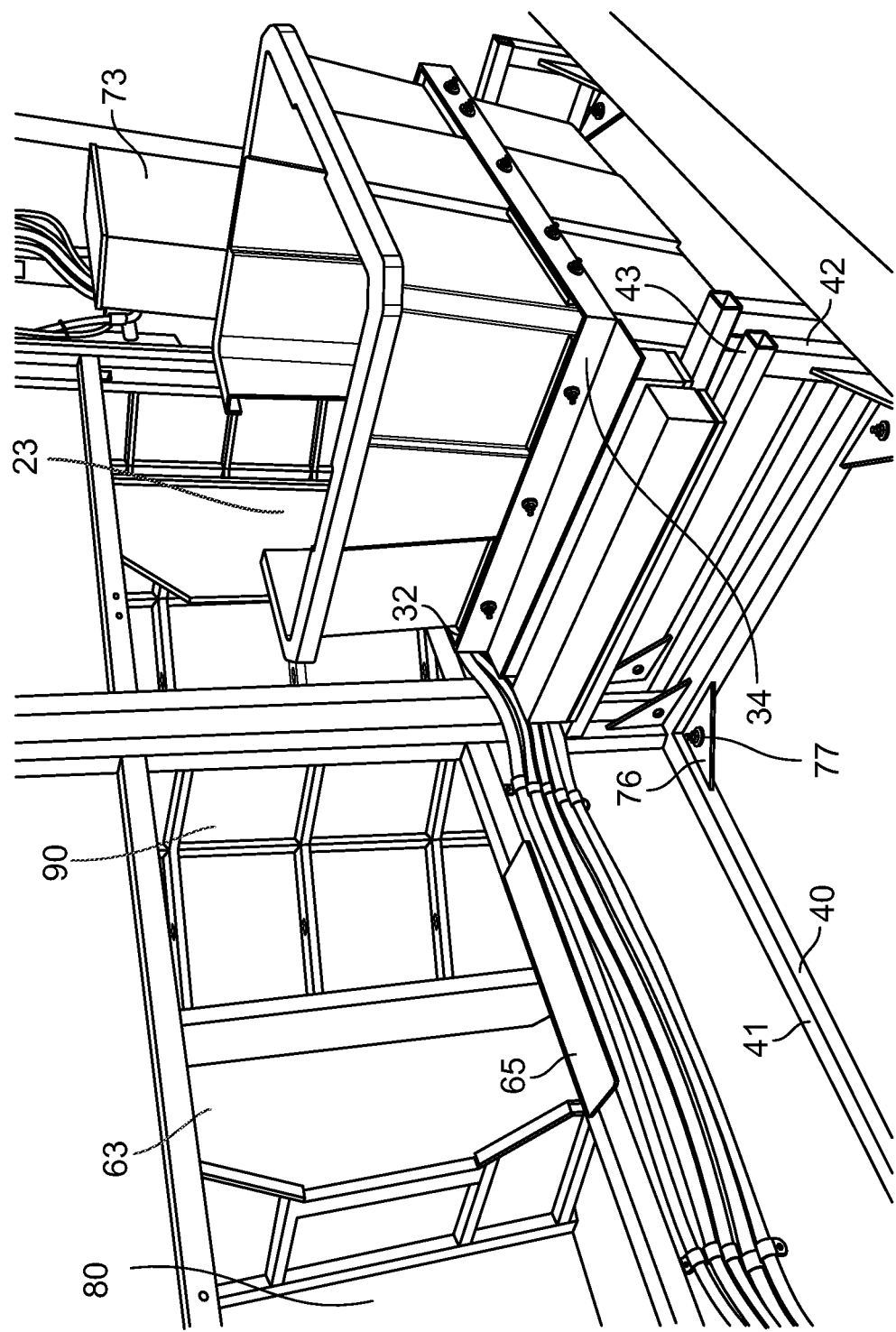
FIG. 4 is a side proximal view of one embodiment of the instant invention.
Figure 5:
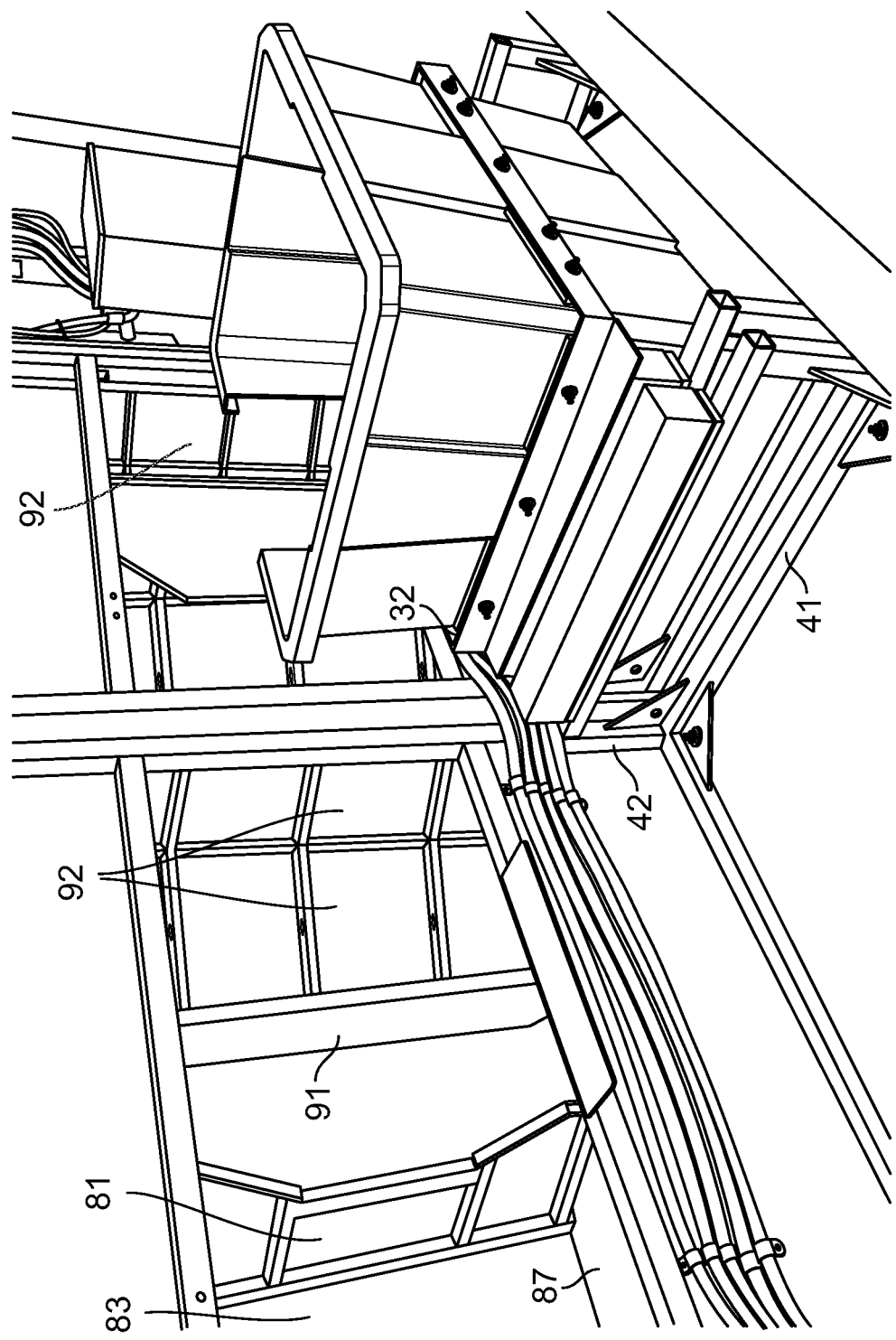
FIG. 5 is a side proximal view of one embodiment of the instant invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The instant invention includes a livestock (bovine, equine, caprine, porcine, ovine, etc.) feeding system designed to monitor individual animal health and behavior, including quantification of daily feed consumption and behavioral rate of consumption. Feed intake, and more specifically feed efficiency, are of particular interest to meat and dairy producers as feed comprises a significant portion of a livestock enterprise's variable operating expense. Livestock that better optimize the relationship of feed inputs to outputs are preferred, resulting in greater profitability for the producer. Additionally, better feed utilization has the promise of reducing the footprint of animal agriculture, i.e. less acres needed for grazing and feed production, reduced methane production. A large body of research exists demonstrating the heritability of traits relative to feed utilization and animal health. Hence, through accurate measurement, genetic improvement is attainable. Propagation of more efficient animals ensures both economic and environmental resource sustainability.

The instant invention is an electronic radio frequency identification (RFID)/electronic identification (EID) based system and method of using that system, developed with the intention to create a highly accurate and automated system that functions principally on the capture of actual, real-time data with limited reliance on algorithmic estimation of weights. The system is designed to be easily incorporated into a conventional feedlot environment and group-feeding setting, utilizing the common feed delivering equipment, pen sizes, and typical specifications of a modern feedlot.

One of the major advancements of the instant invention over prior art is in its physical design and use of advanced RFID technology. For example, one limiting factor of previous systems is a situation in which the tags of two animals can be in close enough proximity to the RFID antenna that both tags are read more or less simultaneously. The electronic results may record as an alternating set of tags reads for both animals. In this situation, it is difficult to determine if both animals were actually consuming feed and consequently matching the RFID data with appropriate weights to determine feed disappearance. As a result, inaccurate sets of both data and results are collected. Additionally, the speed at which one animal exits the system and the next animal enters the system may occur so rapidly that an accurate weight of the stop time of the first animal and/or the weight of the start time of the second animal may not be correctly ascertained.

Furthermore, prior systems have been built based upon utilization of low frequency (LF) RFID technology. One shortcoming with the use of low frequency (LF) technology is the importance of tag proximity to the antenna. Additionally, the position sensitivity of the transponders relative to the antenna is critical and can reduce tag read range. As a result, presence of the animal within the feed intake system, and most importantly the precise time of entrance and exit within the feed intake system can be lost or inaccurate. The process of correcting such "misses" through use of statistical computation can provide incorrect start or stop weight of the feeding session. The sum of these errors can lead to misallocation of feed consumption to other animals within the pen. Furthermore, the lack of precision makes calculation of the "Rate of Consumption" impossible.

Through the instant invention's use of modern UHF technology and improved system design, these conditions are vastly improved. Calculation of the "Rate of Consumption" is possible, with numerous implications as it relates to the precision of measuring individual animal consumption and monitoring behavior. The instant invention utilizes modern Ultra High Frequency (UHF) technology that is omni-directional. Tag orientation to the reader is not nearly as critical as with LF technology.

Cattle in a group-feeding setting are offered access to feed intake system of the instant invention. Feed is presented in a trough for animals to consume. Multiple feeding stations may be adjacent to one another. Each trough is equipped with a precision scale which measures the trough and its feed contents ten times per second (approximately 864,000 times per day). As an animal consumes feed from the trough, the weight decreases, and the data is precisely captured. The feed intake system is equipped with an UHF RFID reader/antenna. Every animal within the group is fitted with a passive UHF, omni-directional ear tag. The RFID/UHF antenna is strategically positioned to detect an animal's entry prior to consuming feed, and upon exiting the system after consuming feed, with a high degree of accuracy. The RFID antenna also reads the animal's tag between the period of entry and exit while it is present in the system consuming feed. An animal's head and RFID ear tag must pass through the antenna's field before it reaches the trough containing feed and after it finishes consuming feed. Additionally, the entire trough is within the antenna's read field allowing continuous monitoring of the animal's presence while eating. The system averages between ten and twenty hits per second from the time an animal enters the system until the time it exits.

These physical aspects of the feed intake system work in synchrony and harmony to continually monitor an animal's presence within the system, simultaneous start and stop weights of the feeding session, and ultimately to measure feed disappearance attributable to each individual animal. Acquired Raw RFID tag data with an accompanying twelve-character timestamp and acquired scale/weight data with an accompanying twelve-character timestamp are recorded and transferred in real time via wireless connection from the feed intake system to a site computer. This data is then transferred from the site computer to a central processing computer every 24 hours. The raw data is reviewed for accuracy. Feed sessions are then determined by matching first and last RFID hits with the appropriate scale weight.

Looking to the Figures, there are illustrated various embodiments of the instant invention. The instant invention discloses a feed intake system 10 including one or more feeding stations 20 which include a trough 22 with an animal feeding access area 23 located at the front of the trough, a pair of sides 24, a back 25 and a bottom. One example of a trough would be a plastic bunk used to transport feed for livestock 75. Looking again to the figures, there is illustrated a support frame 30 surrounding the trough 22, the support frame 30 including a front support 32, a pair of side supports 34 engaged to the front support and a rear support 33 engaged to the side supports. The support frame further includes a pair of side angle supports 35 which include a top and a bottom. The side angle supports 35 are each engaged with a side support 34. The support frame 30 is secured to the trough either by friction or using a plurality of fasteners 31. In one embodiment of the instant invention, the support frame 30 is not required as the trough is designed to engage the scale unit 50 directly.

Each feeding station 20 also includes a base frame 40 supporting the trough 22 and/or the support frame 30 from underneath. The base frame 40 includes a plurality of ground support members 41 which are generally horizontal and designed to rest on the ground, acting as a platform beneath the trough 22, though not touching the trough. The ground support members may be configured in any manner including square or rectangular to provide a stable platform. A plurality of vertical support members 42 emanate upward from the ground support members 41, and a pair of horizontal members 43 are secured to the vertical support members 42.

Figure 7:
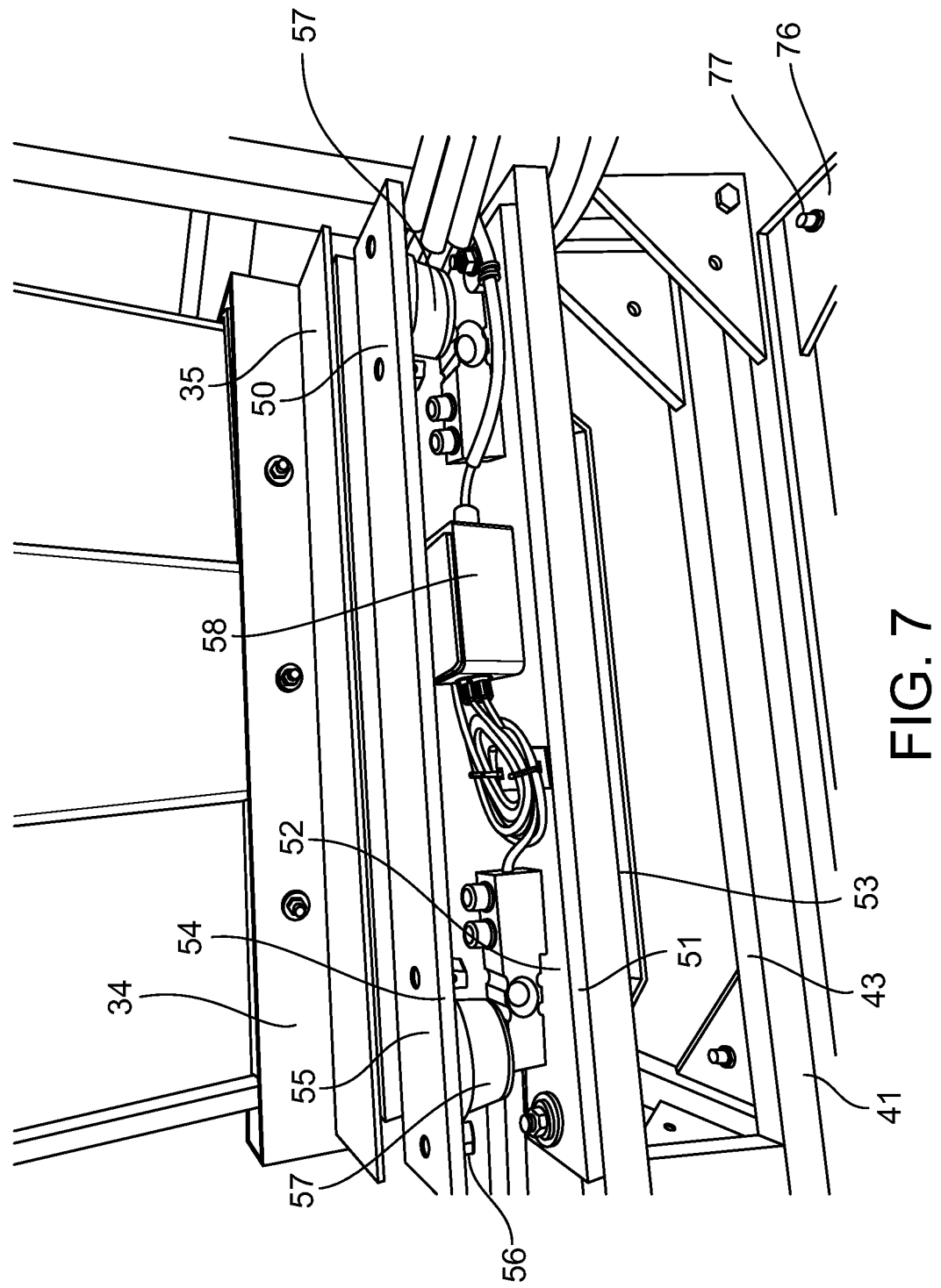
FIG. 7 is a closeup view of components used in one embodiment of the instant invention.
Figure 8:
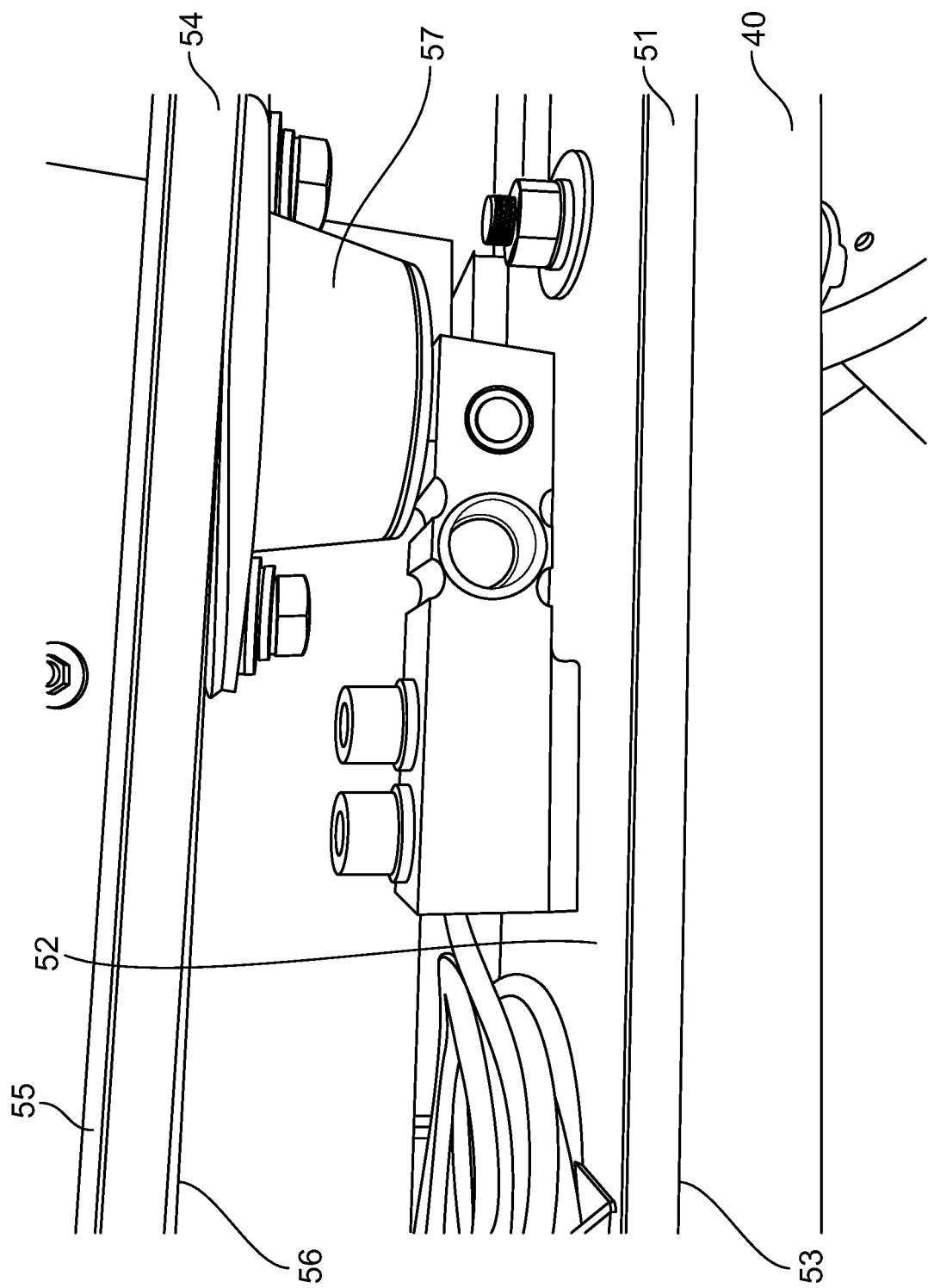
FIG. 8 is a closeup view of components used in one embodiment of the instant invention.
Figure 9:
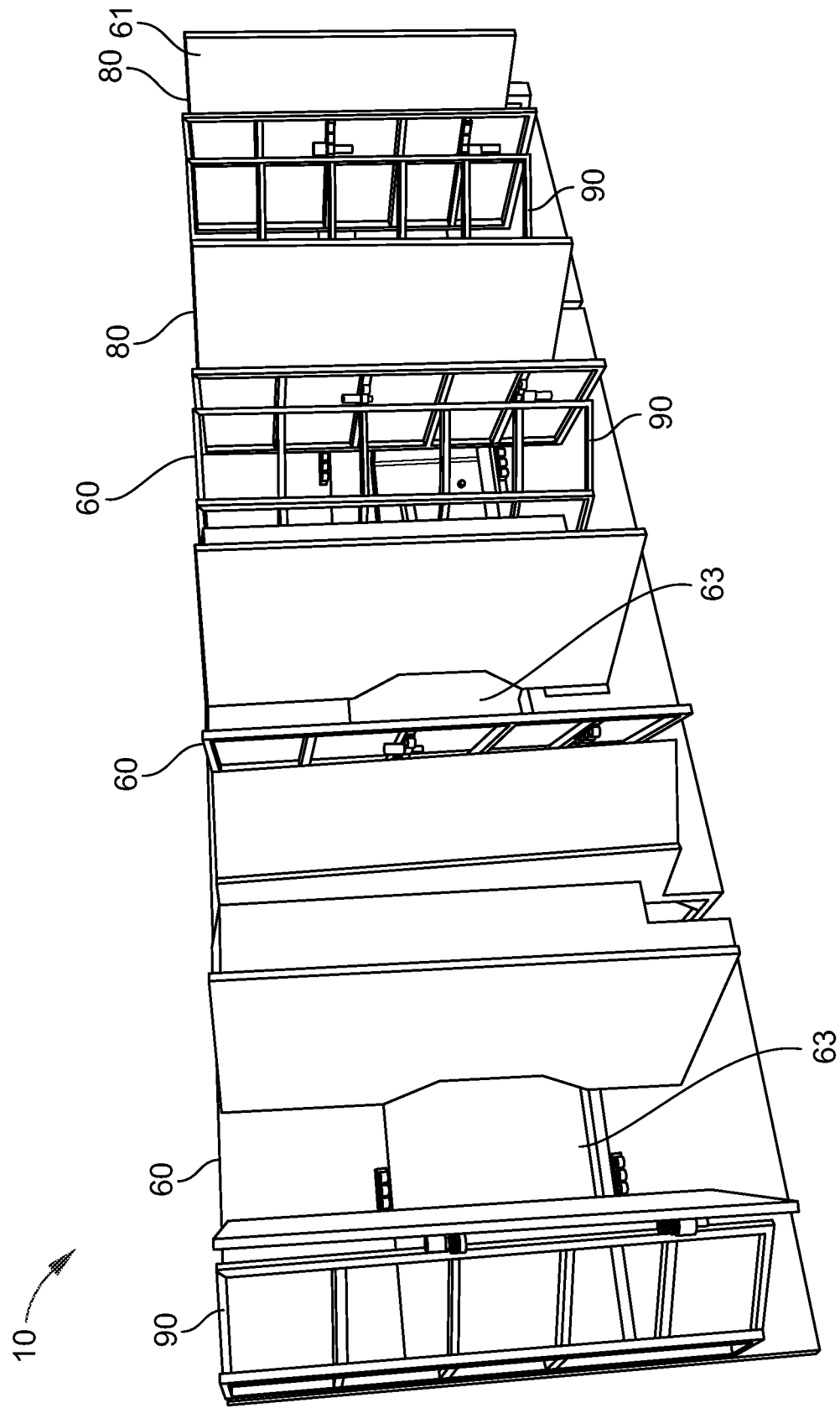
FIG. 9 is a front proximal view of one embodiment of the instant invention.
Figure 10:
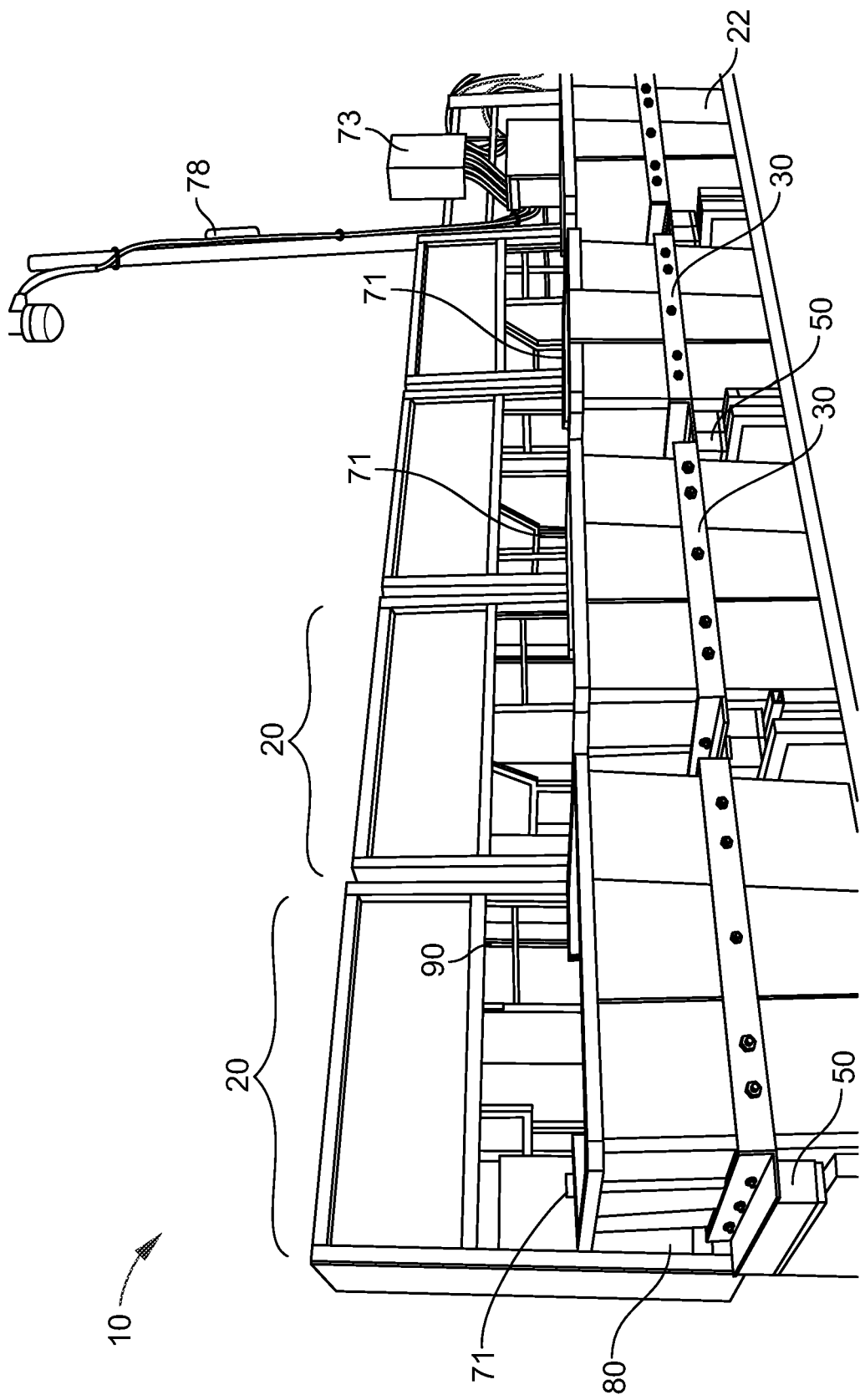
FIG. 10 is a back proximal view of one embodiment of the instant invention.
Figure 11:
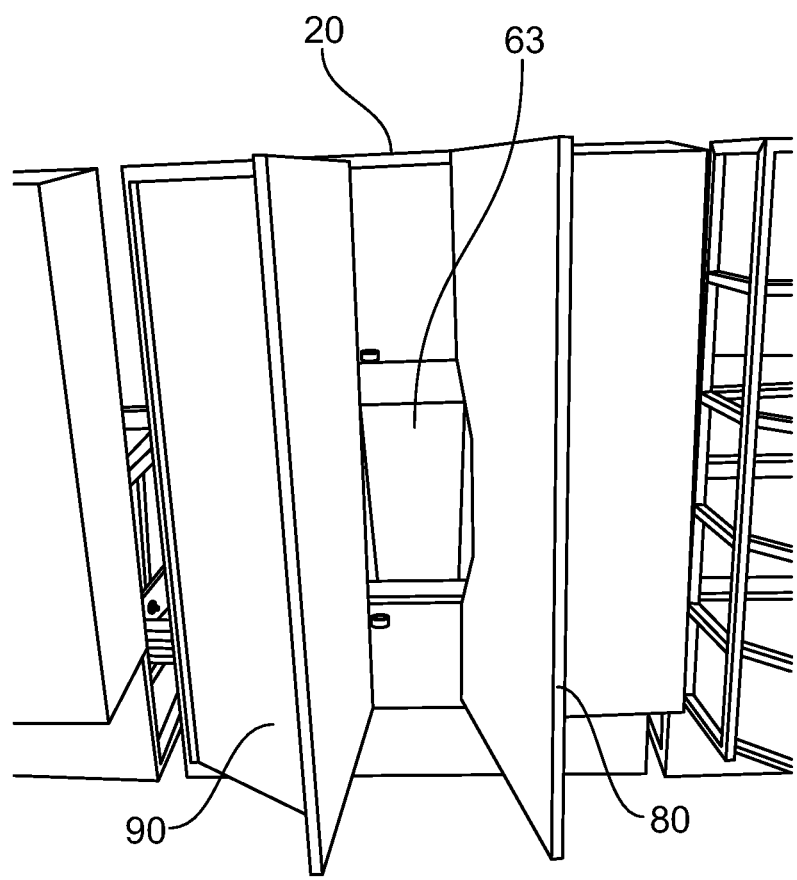
FIG. 11 is a front proximal view of one embodiment of the instant invention.

A scale unit 50 is secured between the base frame 40 and the support frame 30 to enable the scale unit 50 to weigh the contents of the trough 22. Looking to FIGS. 7 and 8, there is illustrated a scale unit 50 comprised of a lower mounting plate 51 with a top 52 and a bottom 53, one or more scale compression mounts 57 with a top and a bottom, wherein each scale compression mount 57 is secured by its bottom to the top 52 of the lower mounting plate. The scale unit 50 also includes one or more scale junction boxes 58 operationally associated with the one or more scale compression mounts 57 to provide power to the unit and to read, transfer and record data generated by the scale compression mounts. An upper mounting plate 54 with a top 55 and a bottom 56 is also include where the upper mounting plate 54 is secured by its bottom 56 to the top of each scale compression mount 57. The scale unit 50 is mounted between the base frame 40 and the support frame 30 and is designed to hold each trough 22 off the ground to enable accurate weight readings of the contents of each trough 22.

Each feeding station 20 also includes a station frame 60 with a front 61, a back 62 and an animal feeding access 63. The station frame 60 is located laterally next to the animal feeding access 23 of the trough 22 so that each of the animal feeding accesses 23, 63 align with one another to create a pathway for livestock 75 to insert their heads and consume feed from the trough 22. The station frame 60 may further include a brisket guard 65 secured to the bottom of the animal feeding access 63 to ensure that the weight of the animal feeding from the trough is not inadvertently included as part of the feed weight within the trough 22. Put another way, the brisket guard 65 prevents the animal from putting its weight (head, neck, etc.) on the trough 22 while the animal is feeding at the feeding station 20. Each station frame may also include one or more restrictor bars which allow the animal feeding access 63 to be decreased or increased in size as desired by the operator.

Figure 6:
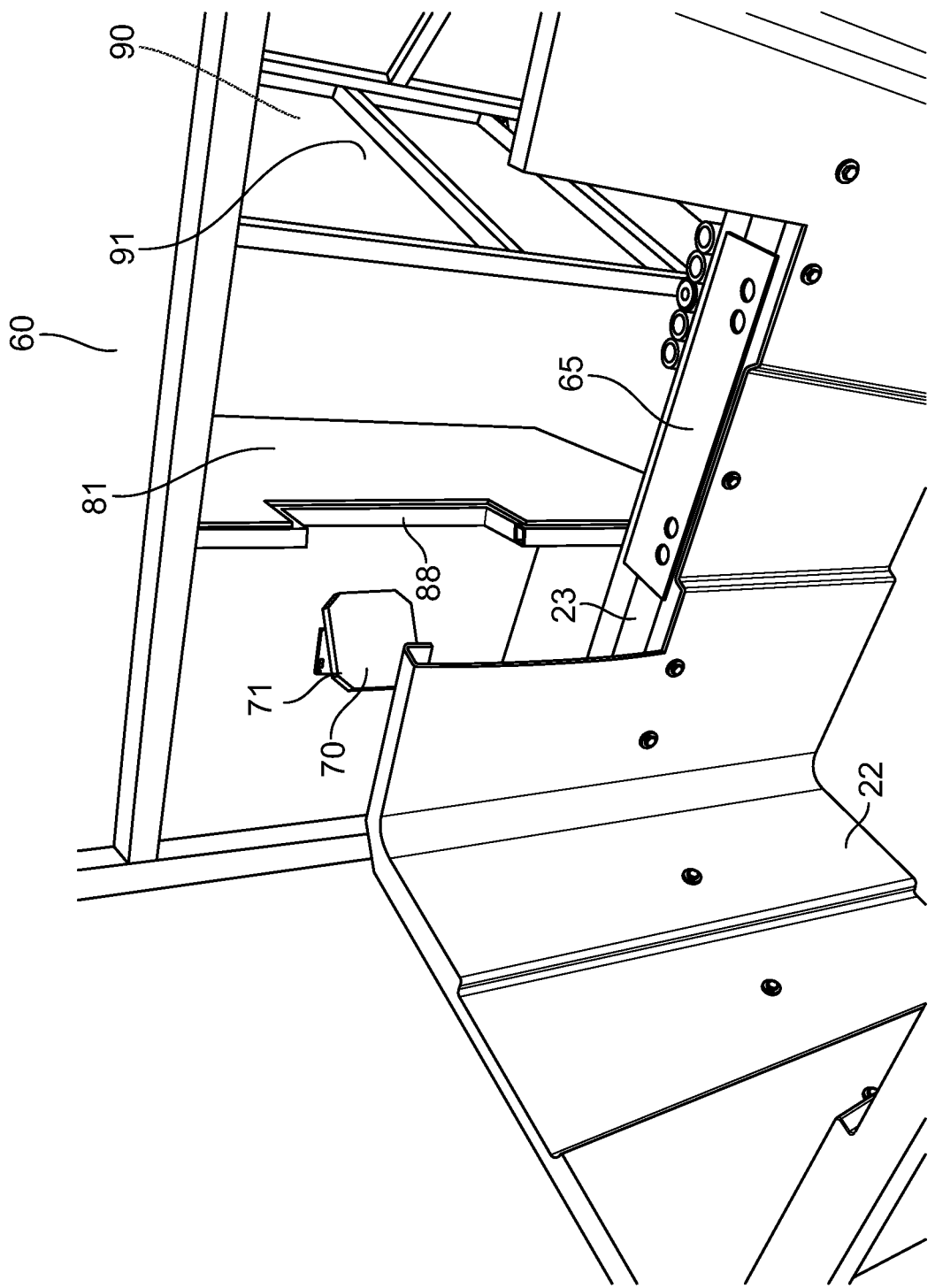
FIG. 6 is a closeup view of components used in one embodiment of the instant invention.
Figure 12:
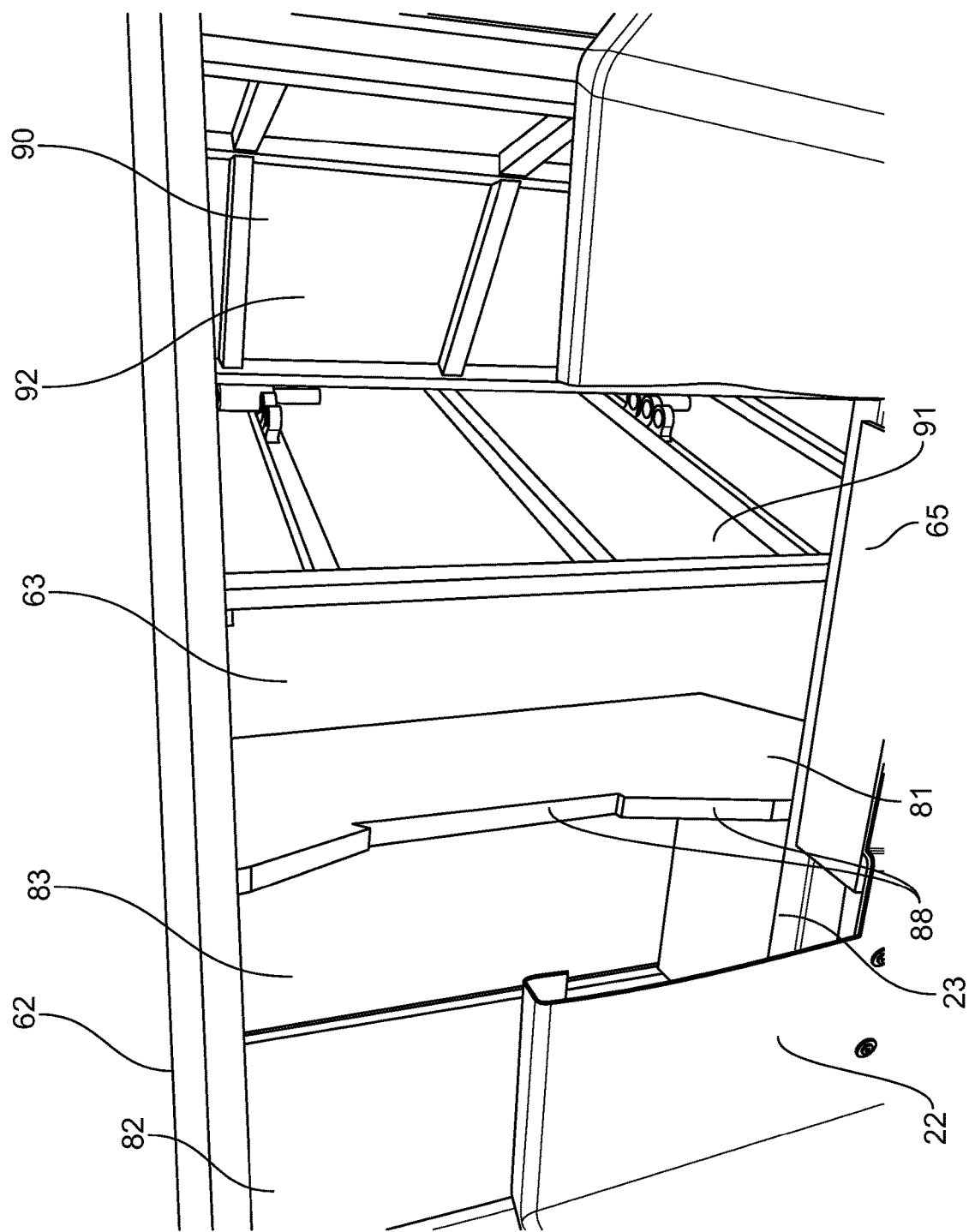
FIG. 12 is a closeup back proximal view of one embodiment of the instant invention.
Figure 13:
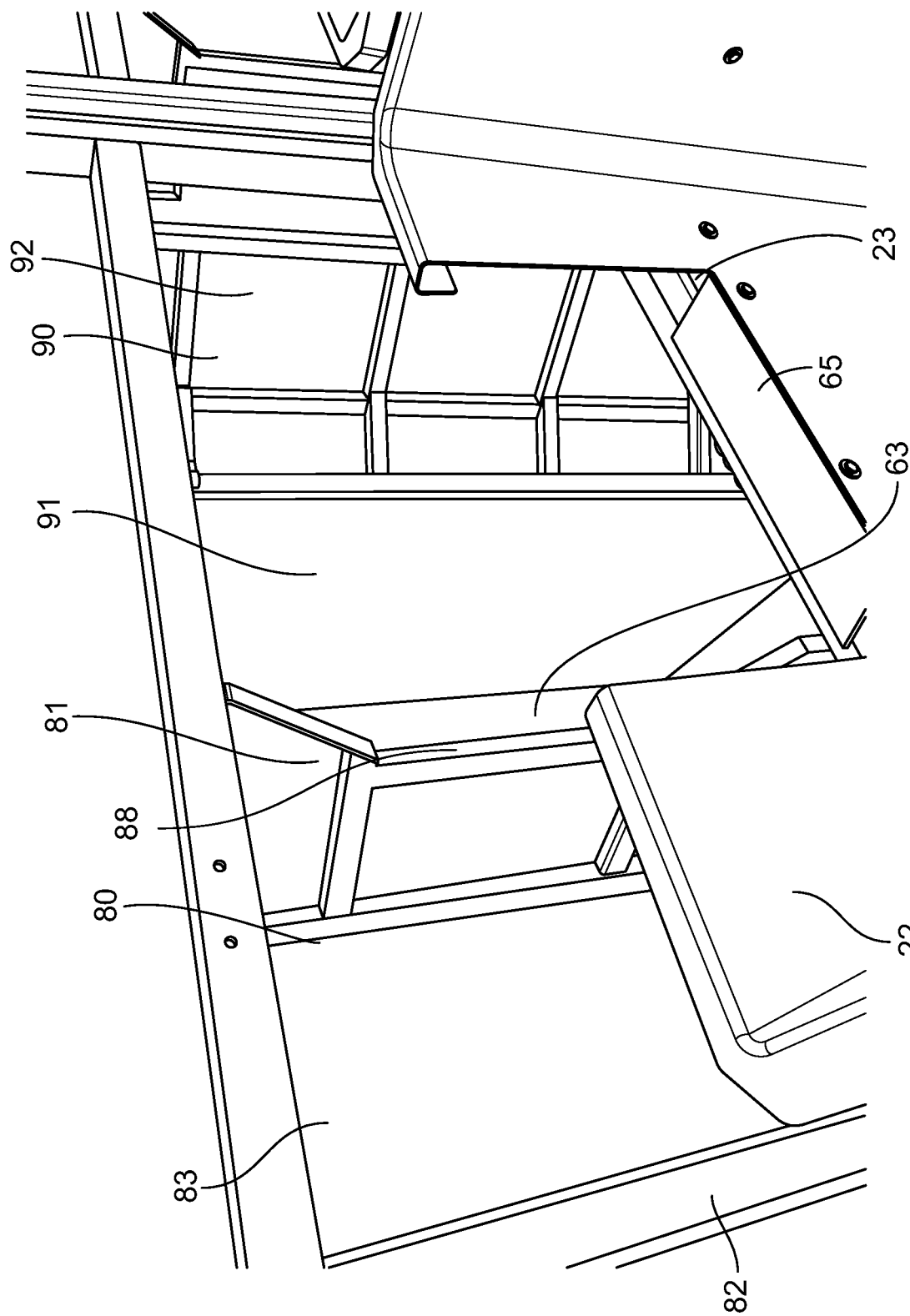
FIG. 13 is a closeup back proximal view of one embodiment of the instant invention.
Figure 14:
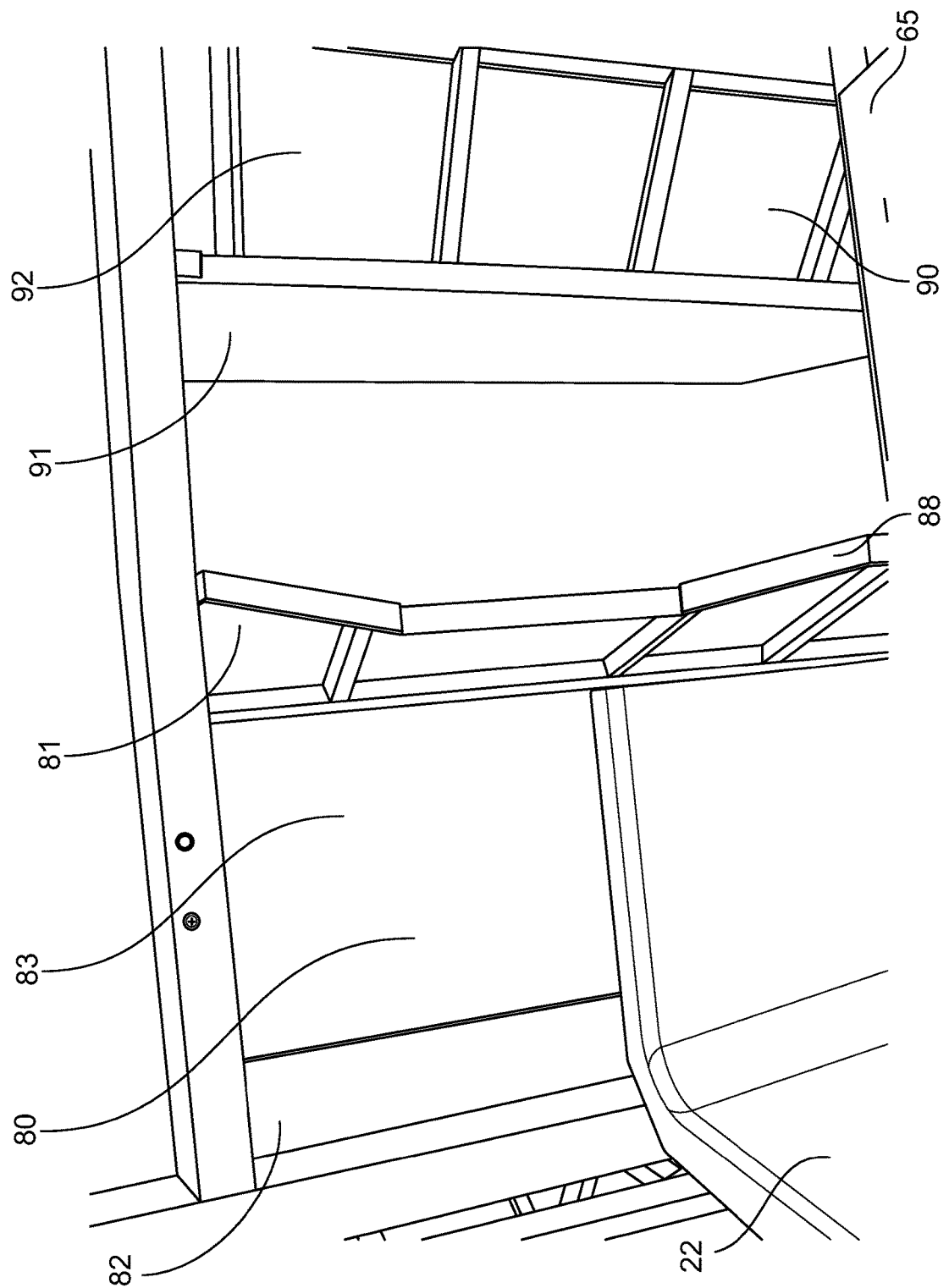
FIG. 14 is a closeup back proximal view of one embodiment of the instant invention.

The station frame 60 of each feeding station 20 further includes a gate system secured to the front 61 of the station frame 60. The gate system includes a first side gate 80 secured to one side of the animal feeding access 63 and a second side gate 90 secured to the opposite side of the animal feeding access 63. The first side gate 80 and the second side gate 90 emanate away from the station frame to create a channel 96 to the animal feeding access 63. The channel 96 created by the gate system permits only a single livestock animal 75 access to the feed in the trough 22 at a time. The first side gate 80 has a front 85 and a back 84 and generally includes a primary panel 81 with a top, a bottom, and a pair of sides. The first side gate 80 further includes a secondary panel 82 with a top, a bottom, and a pair of sides. The first side gate further includes a tertiary panel 83 with a top, a bottom, and a pair of sides. One side of the primary panel 81 is secured to the front 61 of the station frame, while its opposite side is secured to one side of the secondary panel 82. The opposite side of the secondary panel 82 is secured to one side of the tertiary panel 83 while the opposite side of the tertiary panel is secured to the front 61 of the station frame 60. The first side gate 80 can further include a top 86 and a bottom 87. This forms a cavity between the station frame 60 and the back 84 of the first side gate 80. The cavity is one possible location to house the sensor/antenna 71 of the sensor assembly as illustrated in the figures. The sensor assembly can be located on either side of the cavity. There is a space between the cavity and the channel 96, located on the primary panel 81 of the first side gate 80 which is referred to herein as the early sensing opening 88. The early sensing opening 88 is a cutout on the primary panel (see FIGS. 6 and 12) which provides an early line of sight from the sensor antenna 71 to the RFID tag located on the animal. The early sensing opening allows for the reading of the RFID tag before the animal places its head through the animal feeding access 63. Additionally, RFID recording can occur at the conclusion of a feeding session, after an animal has finished eating, passed through animal feeding access 63, and is moving away from the feeding station 20. There can also be a delay in recording from the last RFID tag read to allow for scale calibration. The program has a delay from the last RFID tag read until we call for the corresponding weight from the scale log. This allows the scale to reach equilibrium and applies only to the Stop weights. It is integral to how we execute several commands in the program. It is also the main reason we have the v-gates, which is to create time separation between animal feeding sessions. The time delay can range from 0.1 to 5 seconds, 0.5 to 5 seconds, 1 to 5 seconds, 2 to 5 seconds, 1 to 3 seconds, 0.5 seconds, 1 second, 2 seconds, 3 seconds, 4 seconds, or 5 seconds.

Figure 15:
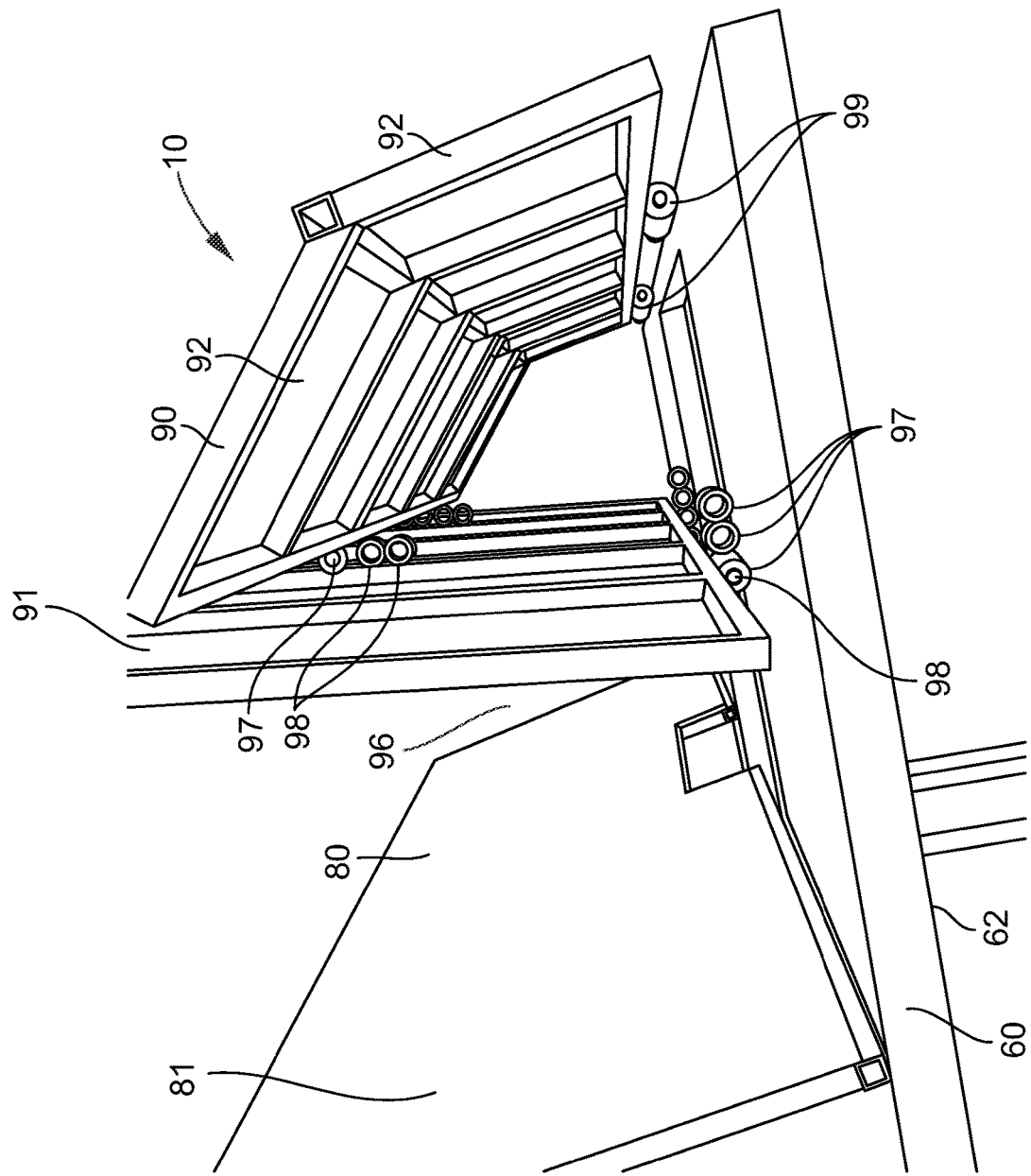
FIG. 15 is a top down view of one embodiment of the instant invention.
Figure 16:
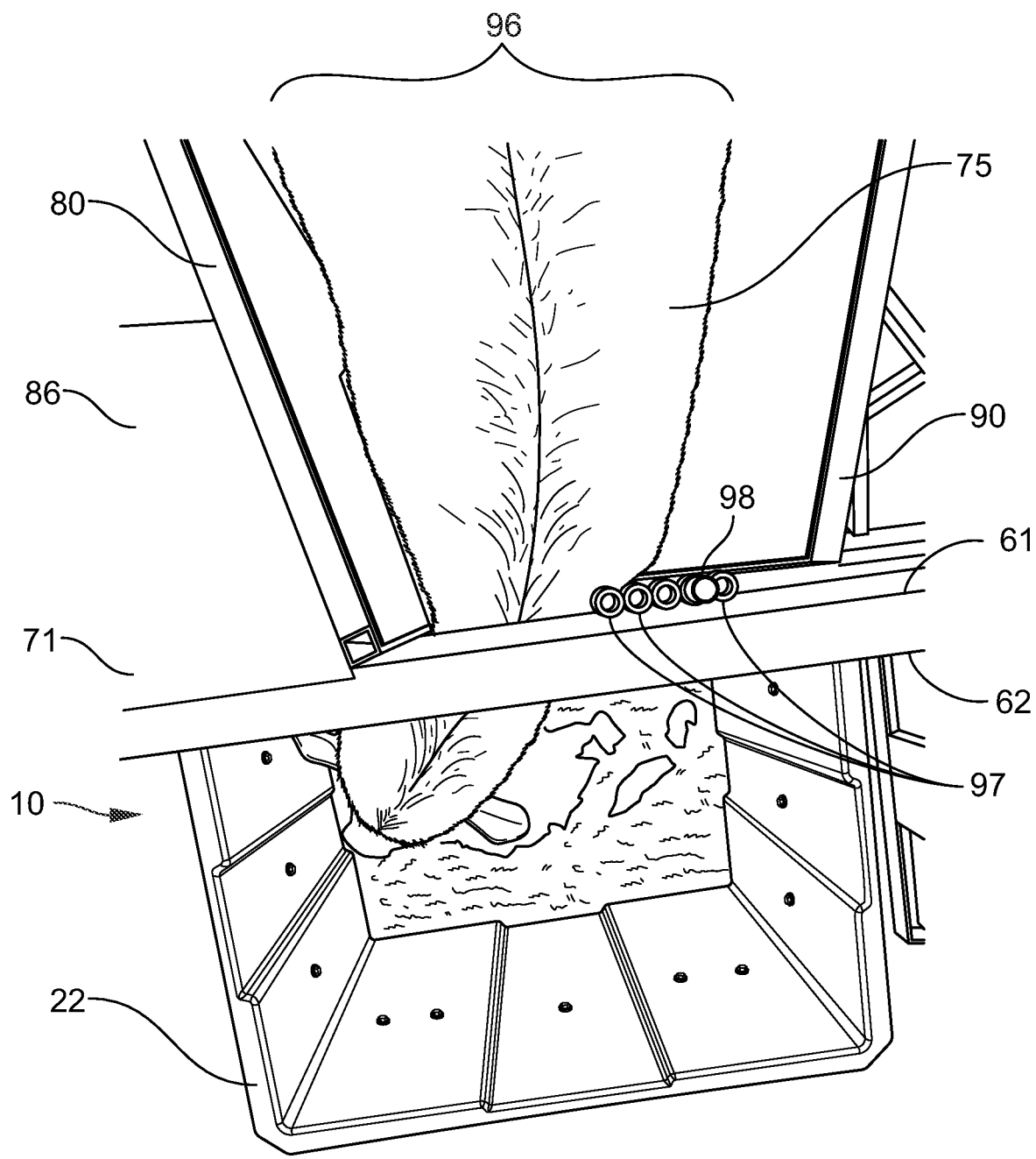
FIG. 16 is a top down view of one embodiment of the instant invention.
Figure 17:
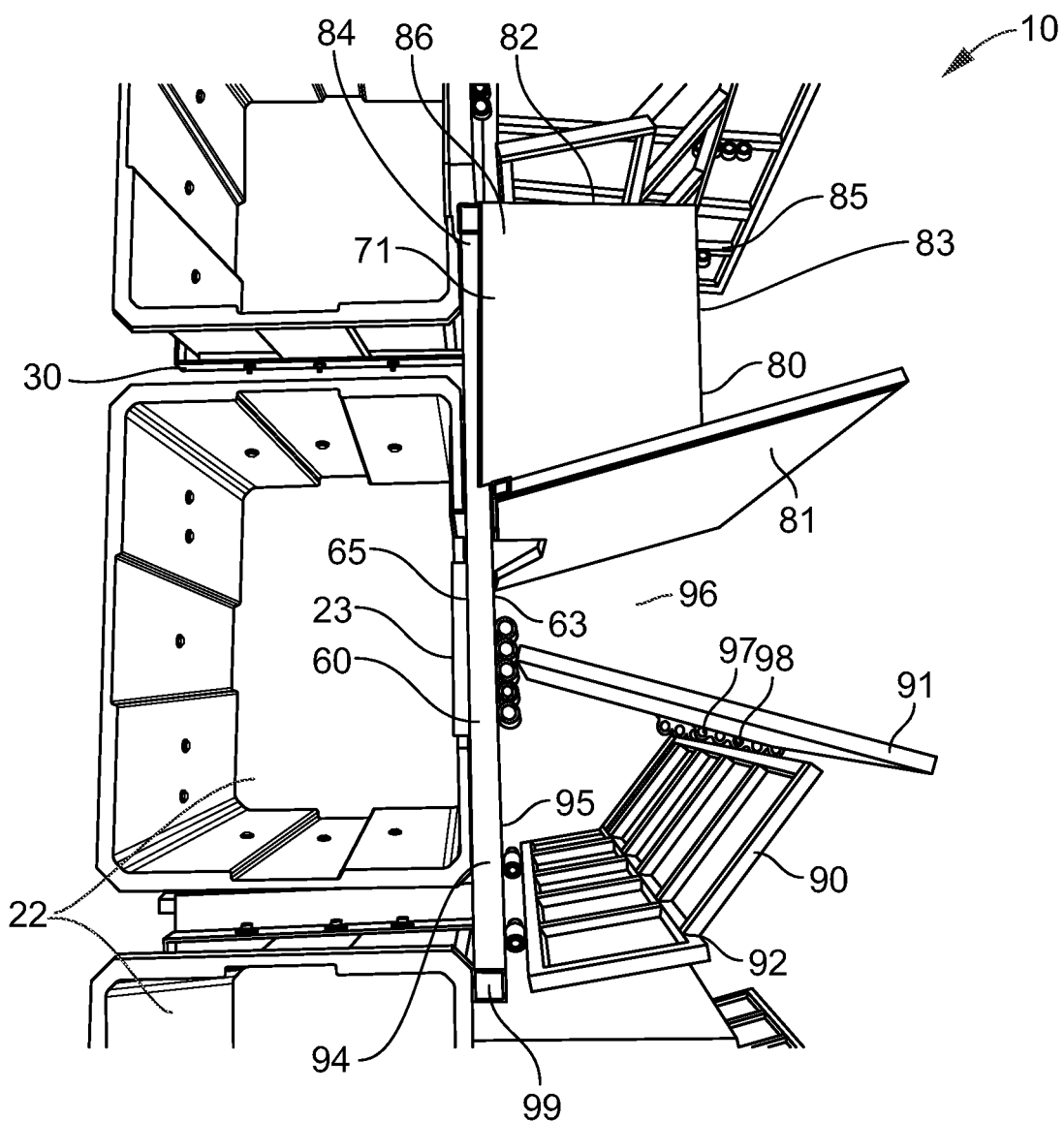
FIG. 17 is a top down view of one embodiment of the instant invention.

The second side gate 90 has a front 95 and a back 94 and generally includes a primary panel 91 with a top, a bottom, and a pair of sides. The second side gate 90 further includes a secondary panel 92 with a top, a bottom, and a pair of sides. One side of the primary panel 91 is secured to the front 61 of the station frame, while its opposite side is secured to one side of the secondary panel 92. The opposite side of the secondary panel 92 is secured to the front 61 of the station frame 60 or to the secondary panel 82 of an adjacent station. The second side gate 90 can further include a top and a bottom (not illustrated). Looking now to FIGS. 15-17, there is illustrated a system for allowing the second side gate 90 to be adjustable. A plurality of hinge ports 97 are secured to the front 61 of the station frame 60. A one or more hinge pins 98 are secured to one side of the primary panel 91 of the second side gate 90 and a plurality of hinge ports 97 are secured to the opposite side. The hinge pin(s) 98 of the primary panel are pivotally engaged to one or more of the hinge port(s) 97 of the station frame. One side of the secondary panel 92 includes one or more hinge pins 98 which are pivotally engaged to the one or more hinge port(s) 97 of the primary panel 91. The opposite side of the secondary panel 92 is pivotally secured to the front of the station frame 60 by one or more mounting mechanisms 99. The interaction of the:

(a) mounting mechanism 99 pivotally connecting the secondary panel 92 to the front of the station frame 60;

(b) the hinge pins 98 pivotally connecting the secondary panel 92 to the hinge ports 97 primary panel 91; and (c) the hinge pins pivotally connecting the primary panel 91 to the front of the station frame 60;

permit the adjustment of the second side gate 90 to narrow or widen the channel 96 created by the first side gate 80 and the second side gate 90 to the animal feeding access 63 of the station frame 60. It has been found that an angle of 0 to 20 degrees off of 90 (or 90 to 120 degrees from the front side 61 of the station frame 60) is optimal for each side gate 80, 90 to be set to create a channel 96 which permits only a single animal access to the animal feeding access. The gate system creates a physical impediment that reduces the speed at which one animal exits the system and the next animal can enter the system. This time separation allow the scale to balance, providing a clearer data set of actual weight (vs. a quick transition of animals in and out of the animal feeding access 23, 63, where the scale output may never reach a balance). The system described above allows the user to maintain the desired angle when adjusting the width of the channel 96. In one embodiment of the instant invention, the angle may be 0, 1, 2, 3, 4, 5, 6, 7, 8, 9, 10, 11, 12, 13, 14, 15, 16, 17, 18, 19 or 20 degrees for each side gate to create and adjust the width of the channel 96. In one embodiment of the present invention, the first side gate 80 is permanently affixed to the station frame and the second side gate 90 is adjustable. In another embodiment of the instant invention, either one or both the first side gate and the second side gate are adjustable to alter both the width and the depth of the channel 96.

A sensor assembly 70 including a sensor or antenna 71 located near the station frame animal feeding access 63. The sensor assembly 70 would read an RFID signal transmitted by a RFID tag 72 associated with a livestock animal 75. The system also includes a control panel 73 and a timestamp generator operationally associated with the sensor assembly 70 and the scale unit 50, where the control panel 73 obtains and records data obtained from the sensor assembly 70 and the scale unit 50. The control panel also includes data storage of any type known in the art for recording all desired data. A computer/processing computer 74 is operationally associated with the control panel 73 for processing the recorded data. The computer 74 also includes data storage of any type known in the art for recording all desired data.

The system also includes a plurality of livestock animals 75, each animal having a RFID tag 72 which transmits a unique RFID signal and tag data associated with that animal each time the animal inserts its head through the animal feeding access 63. This begins a process wherein a starting weight of the feed located within the trough 22 at a starting timestamp generated by the timestamp generator is collected by the control panel 73 and recorded within a first log file. Additional weights of the feed located within the trough 22 along with a timestamp generated by the timestamp generator are collected and recorded within the first log file for a determined amount of time. Each unique RFID signal and tag data are collected and recorded using the sensor assembly 70 each time an animal puts its head through the station frame animal feeding access 63 along with a timestamp generated by the timestamp generator and stored/recorded within a second log file. The data within the first log file and the second log file are each processed using the computer/processing computer 74 to correlate the time stamps and recorded feed weights from the first log file with the time stamps and RFID signal and tag data from the second log file resulting in correlated data. The computer/processing computer 74 is then used to determine and calculate the weight of the feed consumed, duration that each animal spent eating, behavioral rate of consumption, and other associated calculations from the correlated data. Data is transferred between the various components of the feed intake system 10 by wire, wirelessly, or a combination thereof.

In one embodiment of the instant invention, the feed intake system 10 is modular and mobile. A mobile system that can contain a variable number of stations, assembled together as one complete unit, transported monolithically from site to site, and ready to begin operation with connection to electrical supply via solar or standard connection.

In another embodiment, additional weights are collected by the control panel 73 at least ten times per minute and recorded within the first log file. In still another embodiment, additional weights are collected by the control panel 73 at least ten times per second and recorded within the first log file. In yet another embodiment, the system 10 operates on a cycle duration of 1, 2, 4, 6, 8, 12, 16 or 24 hours.

The instant application also includes a method for monitoring the feed intake of individual livestock animals comprising the steps of:

(1) providing a feed intake system 10 including one or more feeding stations 20 comprising:
    a. a trough 22 with an animal feeding access 23;
    b. a support frame 30 surrounding the trough 22;
    c. a base frame 40 supporting the trough 22;
    d. a scale unit 50 secured between the base frame 40 and the support frame 30 to enable the scale unit 50 to weigh the contents of the trough 22;
    e. a station frame 60 with an animal feeding access 63, the station frame located laterally next to the animal feeding access 23 of the trough 22;
    f. a sensor assembly 70 including a sensor or antenna 71 located near the station frame animal feeding access 63;
    g. a control panel 73 and a timestamp generator operationally associated with the sensor assembly 70 and the scale unit 50, the control panel 73 obtaining and recording data obtained from the sensor assembly 70 and the scale unit 50; and
    h. a computer/processing computer 74 operationally associated with the control panel 73 for processing the recorded data;

(2) providing one or more animals 75, each animal having a RFID tag 72 which transmits a unique RFID signal and tag data associated with that animal 75;

(3) collecting and recording a starting weight of a feed located within the trough 22 at a starting timestamp generated by the timestamp generator within a first log file;

(4) collecting and recording additional weights of the feed located within the trough 22 along with a timestamp generated by the timestamp generator within the first log file;

(5) collecting and recording each unique RFID signal and tag data with the antenna 71 of the sensor assembly 70 each time an animal 75 puts its head through the station frame animal feeding access 63 along with a timestamp generated by the timestamp generator within a second log file;

(6) processing the data with the first log file and the second log file with the computer/processing computer 74 to correlate the time stamps and recorded feed weights from the first log file with the time stamps and RFID signal and tag data from the second log file resulting in correlated data; and (7) determining and calculating a weight of the feed consumed and a duration that each animal spent eating from the correlated data.

The instant application also includes a method for monitoring the feed intake of individual livestock animals comprising the steps of:

(1) providing a feed intake system 10 including one or more feeding stations 20 comprising:
   a. a trough 22 with an animal feeding access 23;
   b. a support frame 30 surrounding the trough 22, the support frame 30 including a front support 32, a rear support 33 and a pair of side supports 34;
   c. a base frame 40 supporting the trough 22, the base frame 40 including a plurality of ground support members 41, a plurality of vertical support members 42 emanating upward from the ground support members 41, and a pair of horizontal members 43 secured to the vertical support members 42;
   d. a scale unit 50 secured between the base frame 40 and the support frame 30 to enable the scale unit 50 to weigh the contents of the trough 22;
   e. a station frame 60 with an animal feeding access 63, the station frame located laterally next to the animal feeding access 23 of the trough 22;
   f. a sensor assembly 70 including a sensor or antenna 71 located near the station frame animal feeding access 63;
   g. a control panel 73 and a timestamp generator operationally associated with the sensor assembly 70 and the scale unit 50, the control panel 73 obtaining and recording data obtained from the sensor assembly 70 and the scale unit 50; and
   h. a computer/processing computer 74 operationally associated with the control panel 73 for processing the recorded data;
(2) providing one or more animals 75, each animal having a RFID tag 72 which transmits a unique RFID signal and tag data associated with that animal 75;
(3) collecting and recording a starting weight of a feed located within the trough 22 at a starting timestamp generated by the timestamp generator within a first log file;
(4) collecting and recording additional weights of the feed located within the trough 22 along with a timestamp generated by the timestamp generator within the first log file;
(5) collecting and recording each unique RFID signal and tag data with the sensor assembly each time an animal 75 puts its head through the station frame animal feeding access 63 along with a timestamp generated by the timestamp generator within a second log file;
(6) processing the data with the first log file and the second log file with the computer/processing computer 74 to correlate the time stamps and recorded feed weights from the first log file with the time stamps and RFID signal and tag data from the second log file resulting in correlated data; and
(7) determining and calculating a weight of the feed consumed and a duration that each animal spent eating from the correlated data.

In one embodiment of the instant invention, two log files are collected from each feeding station 20 for each twenty-four-hour period. The first log file records measurements from the scale unit 50 ten times per second and contains around 864,000 entries. As cattle eat, the trough 22 weight goes down, and when the troughs 22 are refilled, the weight goes up. The second log file is a collection of RFID tag (RFID tag 72) data. As each animal puts its head through the animal feeding access 23, 33, the RFID antenna records the tag number which identifies that animal. Both log files include a timestamp for each entry. At the end of the twenty-four-hour period, the log files are stopped, stored locally and new ones are started for the next day.

Completed log files are retrieved and processed by the computer/processor 74 by a software application that is programmed to determine the amount of feed consumed by each animal. The following is a walkthrough of a software program used in the instant invention:

Step 1: Raw data (scale and RFID) transferred from site computer to central computer:
1a. (a) RFID Data files (b) Scale/Weight Data files; automatically moved from site computer to the central processing computer every 24 hours @ Midnight
   Both Log files are for a 24-hour period
1b. Central computer downloads and performs a backup of all data:
   Daily files saved by folder tree
      Customer number
      Test number
      Date
      Designation of RFID or Scale respective Station # (1, 2, 3, 4, etc.)
An audit is conducted to ensure a complete record of scale weights for the day, with a total of 864,000+/−observations per 24 hour period.
Step 2: RFID Data Processing
2a. Transfer RFID Data from notepad file to processing file for each Station
   Processing of RFID Data—Completed in a separate file for each Station
      Data cleaning and standardization
         RFID Data logged as the animal presents itself within the system and continuously until exiting the system
         RFID Data log is in chronological order
2b. Each RFID log entry has an RFID, the date, and a standardized (12 character) timestamp to the nearest 1000th second
   Confirm for each entry
2c. Monitor for broken data lines
   Repair or eliminate
2d. Break each log entry into two columns
   One with the RFID; and
   One with the associated timestamp
   Determine "Feeding Sessions"
   Feeding Sessions are defined as an uninterrupted cluster of RFID hits from one animal, in which consumption has occurred.
   Each row of the processing spreadsheet shall be a unique Feeding Session
   Interim Time is the time between Feeding Sessions when no animal is present
2e. The following criteria will be calculated on each Feeding Session:
   The animal's "Tag"/Identification
   The "Bin" (Trough) #
   The Feeding Session Sequence ("SEQ") # for each trough and for each day
   The first hit/presentation of an animal shall be the RFID "Time Start"
   The last hit (followed by disappearance) of an animal shall be the RFID "Time Stop"
   The "Duration" of the feeding session shall be RFID "Time Stop" minus RFID "Time Start"
   "RFID Total" is the total count of RFID hits between and including RFID "Time Start" and RFID "Time Stop"

"Average Hits" is the number of hits per second for Feeding Session
Interim "Prior Time Gap" before Start of this Feeding Session
  RFID "Time Start" of this Feeding Session minus RFID "Time Stop" of immediate prior Feeding Session
Interim "Post Time Gap" until Next Feeding Session
  RFID "Time Start" of immediate following Feeding Session minus RFID "Time Stop" of this Feeding Session
Sample of Processed RFID Data File Headers

| File Date: 2020 Jun. 28 Feeding Session | | | | | | | |
|---|---|---|---|---|---|---|---|
| Seq | | Times | | RFID Hits | | Time Gaps | |
| Tag | Bin No. | Start | Stop (+3) | Duration | Total | Avg. | Prior | Post |

Pre-Merging Audit of Processed RFID file
2f "Step-Aways": Check for breaks of greater than 30 seconds within Uninterrupted cluster of hits from the same animal.
  Animals look like they are present, but actually left for a long period of time and were the next to come back.
  Break at the gap and record as two or more unique feeding sessions.
2g The program maintains an inventory of all animals presently on test.
  If a "foreign" RFID tag is presented, the program records and flags in the Final Report.
2h Monitor for RFID tags in inventory but missing from Processed RFID Data File
  Sick/injured animals?
  Tag fell off animal/malfunctioning?
  Record and Flag in Final Report
2i Daily Trough Metrics
  Total Number of RFID hits per station
    Send to Final Report
  Total Duration of Consumption time per station
    Send to Final Report
  Compare Daily (Chart to show differences in behavior—e.g. weather changes, etc).
    Compare Station to Station
  RFID Data Log is now prepared for Step 4
Step 3: Scale Weight Data Processing (Runs concurrent with Step 2)
3a Transfer Scale/Weight Data from notepad file to processing file for each Station
  Processing of Weight Data—Completed in a separate file for each Station
  Data Cleaning and Standardization
    Each Scale log entry has a weight, a date, and a standardized (12 character) timestamp to the nearest 1000th second
    Scale Data is recorded 10 times per second—approximately 864,000 times/24 hour period.
    Scale Data log is in chronological order
3b Monitor for broken data lines
  Repair or eliminate
3c Break each log entry into two columns—one with the Weight and one with the associated 12-character timestamp (standardized format)
3d Convert weight data from kilograms to pounds
  This step may be postponed until the end of the process or skipped altogether
  Note: Scale logs do not identify animals, but since only one animal can feed from a trough at a time, matching the timestamps between the two log files represents positive identification of each animal.
  Scale/Weight Data Log is now prepared for Step 4
Step 4: Merging Feed Sessions with appropriate Scale Weight
4a Verify RFID and Scale/Weight files have matching Station and Date
  The following will be calculated on each Feeding Session
    Determine Feeding Session "Start" and "Stop" Weight
4b The nearest Weight to the time corresponding with the RFID "Time Start" is called for from the weight file. This represents the "Start Weight"
4c The nearest Weight to the time corresponding with the RFID "Time Stop" plus 3.0 seconds is called for from the weight file. This represents the "Stop Weight".
4d Feed Consumed ("Difference")—kg/lbs during the Session is calculated as Start weight less Stop Weight
  Determine Interim Weight Changes before and after feeding session
    Interim Time is the time between Feeding Sessions when no animal is present. Interim Weight are the scale weight changes during the Interim Time.
4e Weight at RFID Time Start of this Feeding Session minus Weight at RFID Time Stop of the immediate prior Feeding Session—represented as "Prior Weight Gap".
4f Weight at RFID Time Start of next Feeding Session minus Weight at RFID Time Stop of this Feeding Session—represented as "Post Weight Gap".
4g Consumption Rate/Minute—The Average Rate of Consumption per minute.
  Calculated as Feed Consumed (Difference) divided by # of minutes.
Sample of Merged Feeding Session Columns with Scale Data columns added in green

| File Date: 2020 Jun. 28 Feeding Session | | | | | | | | | |
|---|---|---|---|---|---|---|---|---|---|
| Seq | | | Times | | RFID Hits | | | Time Gaps | |
| Tag | Bin | No. | Start | Stop (+3) | Duration | Total | Avg. | Prior | Post |
| 666 | 1 | 1 | 00:04:37.733 | 00:08:12.206 | 00:03:34.473 | 648 | 3.0 | 00:00:05.953 | 00:00:14.953 |
| 981 | 1 | 2 | 00:08:27.159 | 00:14:17.633 | 00:05:50.474 | 998 | 2.8 | 00:00:14.953 | 00:00:02.984 |
| 967 | 1 | 3 | 00:14:20.617 | 00:16:00.165 | 00:01:39.548 | 260 | 2.6 | 00:00:02.984 | 00:00:02.938 |
| 981 | 1 | 4 | 00:16:03.103 | 00:16:26.165 | 00:00:23.062 | 100 | 4.3 | 00:00:02.938 | 00:00:07.937 |
| 967 | 1 | 5 | 00:16:34.102 | 00:22:44.622 | 00:06:10.520 | 745 | 2.0 | 00:00:07.937 | 00:00:18.437 |
| 981 | 1 | 6 | 00:23:03.059 | 00:26:25.042 | 00:03:21.983 | 779 | 3.8 | 00:00:18.437 | 00:00:07.499 |
| 967 | 1 | 7 | 00:26:32.541 | 00:30:47.065 | 00:04:14.524 | 560 | 2.2 | 00:00:07.499 | 00:00:10.953 |
| 981 | 1 | 8 | 00:30:58.018 | 00:31:35.563 | 00:00:37.545 | 169 | 4.5 | 00:00:10.953 | 00:00:04.703 |
| 967 | 1 | 9 | 00:31:40.266 | 00:31:48.813 | 00:00:08.547 | 21 | 2.4 | 00:00:04.703 | 00:00:05.687 |

-continued

| | | | | | | | | | |
|---|---|---|---|---|---|---|---|---|---|
| 981 | 1 | 10 | 00:31:54.500 | 00:32:14.312 | 00:00:19.812 | 131 | 6.6 | 00:00:05.687 | 00:00:09.453 |
| 967 | 1 | 11 | 00:32:23.765 | 00:36:13.059 | 00:03:49.294 | 411 | 1.7 | 00:00:09.453 | 00:00:03.922 |
| 981 | 1 | 12 | 00:36:16.981 | 00:39:55.755 | 00:03:38.774 | 910 | 4.1 | 00:00:03.922 | 00:00:03.703 |
| 070 | 1 | 13 | 00:39:59.458 | 00:52:39.453 | 00:12:39.995 | 3576 | 4.7 | 00:00:03.703 | 00:00:04.672 |
| 064 | 1 | 14 | 00:52:44.125 | 00:57:17.645 | 00:04:33.520 | 1261 | 4.6 | 00:00:04.672 | 00:02:32.183 |
| C4B | 1 | 15 | 00:59:49.828 | 01:00:40.623 | 00:00:50.795 | 111 | 2.1 | 00:02:32.183 | 00:00:02.953 |
| 064 | 1 | 16 | 01:00:43.576 | 01:00:58.123 | 00:00:14.547 | 28 | 1.9 | 00:00:02.953 | 00:00:07.703 |
| C4B | 1 | 17 | 01:01:05.826 | 01:02:56.557 | 00:01:50.731 | 307 | 2.7 | 00:00:07.703 | 00:00:02.999 |
| 56B | 1 | 18 | 01:02:59.556 | 01:04:34.804 | 00:01:35.248 | 148 | 1.5 | 00:00:02.999 | 00:00:02.750 |
| 064 | 1 | 19 | 01:04:37.554 | 01:05:37.352 | 00:00:59.798 | 286 | 4.7 | 00:00:02.750 | 00:00:02.437 |

File Date: Weights

| Seq Tag | Bin | No. | Kg | | | Gaps | | |
|---|---|---|---|---|---|---|---|---|
| | | | Start | Stop | Diff | Rate | Prior | Post |
| 666 | 1 | 1 | 44.66 | 44.28 | 0.38 | 0.106 | 0.00 | 0.00 |
| 981 | 1 | 2 | 44.28 | 43.68 | 0.60 | 0.103 | 0.00 | 0.00 |
| 967 | 1 | 3 | 43.68 | 43.48 | 0.20 | 0.121 | 0.00 | 0.00 |
| 981 | 1 | 4 | 43.48 | 43.42 | 0.06 | 0.156 | 0.00 | 0.00 |
| 967 | 1 | 5 | 43.42 | 42.70 | 0.72 | 0.117 | 0.00 | 0.00 |
| 981 | 1 | 6 | 42.70 | 42.24 | 0.46 | 0.137 | 0.00 | 0.00 |
| 967 | 1 | 7 | 42.24 | 41.76 | 0.48 | 0.113 | 0.00 | 0.00 |
| 981 | 1 | 8 | 41.76 | 41.64 | 0.12 | 0.192 | 0.00 | 0.00 |
| 967 | 1 | 9 | 41.64 | 41.60 | 0.04 | 0.281 | 0.00 | 0.00 |
| 981 | 1 | 10 | 41.60 | 41.54 | 0.06 | 0.182 | 0.00 | 0.02 |
| 967 | 1 | 11 | 41.56 | 41.06 | 0.50 | 0.131 | 0.02 | 0.00 |
| 981 | 1 | 12 | 41.06 | 40.68 | 0.38 | 1.104 | 0.00 | 0.00 |
| 070 | 1 | 13 | 40.68 | 39.38 | 1.30 | 0.103 | 0.00 | 0.00 |
| 064 | 1 | 14 | 39.38 | 38.82 | 0.56 | 0.123 | 0.00 | 0.00 |
| C4B | 1 | 15 | 38.82 | 38.78 | 0.04 | 0.047 | 0.00 | 0.00 |
| 064 | 1 | 16 | 38.78 | 38.70 | 0.08 | 0.330 | 0.00 | 0.00 |
| C4B | 1 | 17 | 38.70 | 38.50 | 0.20 | 0.108 | 0.00 | 0.00 |
| 56B | 1 | 18 | 38.50 | 38.30 | 0.20 | 1.126 | 0.00 | 0.00 |
| 064 | 1 | 19 | 38.30 | 38.16 | 0.14 | 0.140 | 0.00 | 0.00 |

Note:
Animals may appear more than once in the file because animals may visit the feed trough several times during the day.

Step 5: Classification of Feeding Sessions and Identification of Anomalies
5a General Classification of Feeding Session:

| | | Normal Feeding Session | | |
|---|---|---|---|---|
| Code 0 | # | Conditions | Requirement | |
| | 1 | Feed Consumed (Difference) | >0.00 kg | TRUE |
| | 2 | Rate of Consumption (minimum threshold) | >0.00 | TRUE |
| | 3 | RFID Total Hits | >10 | TRUE |
| | 4 | RFID Hits Per Second | >1.0 | TRUE |
| | 5 | Longest Gap between hits | <30 seconds | TRUE |
| | 6 | Duration | >1 second | TRUE |
| | 7 | Prior Weight Gap (before RFID Start): | <.04 kg or > −.04 kg | TRUE |
| | 8 | Post Weight Gap(after RFID Stop): | <.04 kg or > −.04 kg | TRUE |
| | 9 | Prior Time Gap: | >1.25 second | TRUE |
| | 10 | Post Time Gap: | >1.25 second | TRUE |
| | 11 | Rate of Consumption (maximum threshold) | Upper Threshold set based upon feed type and other test factors | |
| | Code if all conditions met: | | 0 | |
| | Resolution: | | None required | |
| | Notes: | | The "0" Classification typically accounts for 85-90% of all Feeding Sessions. | |
| | 99 | | General Anomaly Code-One or more conditions have not been met to be considered Normal "0" Feeding Session) | |
| | Code if any "0" Normal conditions not met: | | 99 | |
| | Resolution: | | The program proceeds through the following (Step 5B) to detect the cause of each anomaly and find a resolution. The Final Audit (Step 5D) verifies that the correct action was taken. | |

5B Feeding Sessions classified with the General Anomaly Code 99 are further reviewed and classified according to the type of anomaly that has occurred. The Specific Anomaly Codes below occur predictably, with well-established patterns in the data. A resolution to these anomalies is applied by the program followed by final review through the Step 5D Auditing process.

Codes 10-18 Feed Dispensing Events (FDE), and intersections with Feeding Sessions Below is the process to identify when feed dispensing has occurred, to quantify how much feed was delivered to each trough, and if an animal was present during FDE determine how much feed the animal consumed.

Resolution:

Step 1 Identify general time feed dispensing occurred for each trough.

| # | Conditions | Requirement |
|---|---|---|
| 1 and/or | Feed Consumed | <20 kg |
| 2 | Prior Weight Gap: | >20 kg |

Note:
These requirements can be adjusted depending upon the type of feed, official test requirements, operator preferences, # of animals on test, etc.

Code if all conditions met: 10 Attended Refill

Step 2 After a refill is located, the program skips forward a period of time and continue searching until all FDEs are identified.

Step 3 A feeding session marked with Code 10 initiates a process to find the start and stop weight and corresponding times of a feed refilling operation. Using the Start time of this FE, the program begins 20 minutes in arrears in the scale log. The scale weight at this time is noted and set as the benchmark weight. From this point forward the program reviews each subsequent weight (taken every 1/10 of second). Each lower weight sets a new minimum, each higher weight sets a new maximum. This process continues for approximately 60 minutes. It is important to note that some conditions can vary requiring subtle changes to this moving time window (e.g. behavior of the operator delivering the feed). At the end of the process, the following are recorded and shown in the below graph.
a.) Minimum Weight=Start Weight of FDE
b.) Corresponding time to Minimum Weight
c.) Maximum Weight=Stop Weight of FDE
d.) Corresponding time to Max Weight

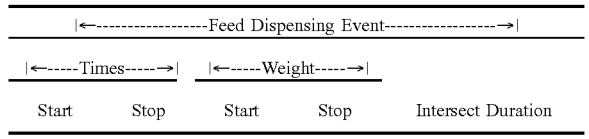

Note:
Stop Weight − Start Weight = Feed Dispensed
Stop Time − Start Time = Length of FDE timespan Step 4 With all the FDE Start and Stops times now identified for the day, all Feeding Sessions with intersecting times are identified. When one of the 4 conditions following is met, Code 10's are reassigned respectively as follows:

Codes and associated conditions met:
15 Animal FS starts before the FDE and finishes during the FDE
16 Animal FS starts during the FDE and finishes during the FDE.
17 Animal FS starts before the FDE and finishes after the FDE.
18 Animal FS starts during the FDE and finishes after the FDE.

Additionally, the duration of time that the feed event intersected with the Start Time/Stop Time window is recorded to the "Intersect duration" column shown in the graph above.

Step 5 The animal's Consumption for this FE is then calculated with the basic formula:
"Consumption"=Actual Consumption before and/or after Refill+Rate of Consumption applied during FDE. More specifically:
Code 15 Consumption=(FE Start Weight−FDE Start Weight)+(Rate of Consumption×Intersect duration)
Code 16 Consumption=(Rate of Consumption×Intersect duration)
Code 17 Consumption=(FE Start Weight−FDE Start Weight)+(Rate of Consumption×Intersect duration)+(FDE Stop Weight−FE Stop Weight)
Code 18 Consumption=(Rate of Consumption×Intersect duration)+(FDE Stop Weight−FE Stop Weight)
Note: The animal's "Rate of Consumption" is derived from a database of all the animal's normal Feeding Sessions, over part or all of the entire test period.

Step 6 Any remaining Code 10's (not recoded to 15-18) are reassigned to Code 11 "Unattended refill".

Code if all conditions met: 11 Unattended Refill (no animal present during FDE)

Feed Dispensed during an unattended refill is used for feed inventory.

20's Midnight Feeding Session Wrap-around

An animal that was in the midst of a feeding session during daily log file restarting process.

21 First Feeding Session of the Day (per trough)
Condition # Flags Requirement
1 For a respective Station, the same animal appears in the TRUE first Feeding Session of today's log and the last Feeding Session of yesterday's log.
2 RFID Time Start of SEQ 1 (Today), within 30 seconds of TRUE midnight (time of relogging)
3 RFID Time Stop of the last SEQ (Yesterday) within 30 seconds TRUE of midnight (time of relogging)
Code if all conditions met: 21
Resolution: Use the "Stop Weight" from yesterday's last Feeding Session involving this animal as the "Start Weight" for this Feeding Session (1st of today).

22 Last Feeding Session of the Day (per trough)
Condition # Flags Requirement
1 Feed Consumed of last SEQ of the day <0.00 TRUE
2 RFID Time Stop of last SEQ of the day within 30 TRUE seconds of midnight (time of relogging)
Code if all conditions met: 22
Resolution: Reassign the "Stop Weight" to 0
Notes: This "Stop Weight" will now serve as the "Start Weight" for this same animal as the first Feeding Session of tomorrow's log.

80's "Waste" Calculations:
Attribute Feed Disappearance as "Waste" that which left the trough but was not consumed by an Inventory Animal.

81 Accounting for Operator Trough Cleaning
Condition # Flags Requirement
1 Tag # "Cleanout" Tag displayed Notes: Operator swipes tag specified for "cleanout", before and after trough cleaning.

Trough is made unavailable to test animals during cleaning.

Code if all conditions met: 81

Resolution: Treated as a feeding session. Feed allocated on reports as "Operator Cleanout".

82 Evaporation (Loss of Scale Weight)

Condition # Flags Requirement

1 Post Weight Gap: <−0.04 kg TRUE

2 Post Time Gap: >5 minutes TRUE

Code if all conditions met: 82

Resolution: The amount of evaporation between feeding sessions is recorded by the program as waste. The requirements can be adjusted depending upon weather conditions.

83 83—Feed Disappearance by Wildlife or non-RFID tagged cattle.

Condition # Flags Requirement

1 Prior Weight Gap: >4 kg & <12 kg TRUE

Notes: Indications that an animal (wildlife) has entered the feed trough and applied pressure to the scale.

Code if all conditions met: 83

Resolution: The program reviews the scale log to find the weight immediately before the wildlife entered the trough and immediately following its departure. The difference is allocated as "83—Waste". Then a new "Start Weight" is assigned to the affected Feeding Session.

84 Feed Disappearance by non-inventoried, RFID tagged animals.

An inventory of all test animals in the pen is submitted by the operator and maintained by the program. If an animal that is not on inventory presents itself, the program notes this foreign animal and its respective consumption.

85 Other Feed Disappearance—Waste

See Final Audit Review

40's and 50's—"Stop" Weight and "Start" Weight Anomalies. Patterns that occur consistently, and at a low rate.

41 Tag/Stop Weight Asynchrony and Negative Consumption

Condition # Flags Requirement

1 Feed Consumption <0.00 kg TRUE

2 Post Weight Gap <Amount of Feed Consumption TRUE

3 Post Time Gap >4.0 seconds TRUE

4 Prior Weight Gap: <0.10 kg or >−0.10 kg TRUE

5 Duration >1 second TRUE

Code if all conditions met: 41

Resolution: Reassign Stop Weight with new "Adjusted Stop Weight": Adjusted Stop Weight=Stop Weight+ Post Gap Weight Example Below is an example showing a feeding event for animal 07F (Middle animal—Sequence 343). The Stop Weight. called by the program for this feeding session occurred at 20:46:07.036 (3.0 following the last RFID hit) at 63.10 kg. The scale was still declining from the weight the animal's mouth was applying to the scale at this time. However, 8/10's of second later at 20:46:07.848 the scale reached equilibrium at 63.02 kg, and stayed at this weight until the next animal arrived. Code 41 corrects these infrequent misses.

| | | | File Date: 2020 Jun. 20 | | | | | | |
|---|---|---|---|---|---|---|---|---|---|
| Seq | | | Times | | RFID Hits | | Time Gaps | | |
| Tag | Bin | No. | Start | Stop (+3) | Duration | Total | Avg | Prior | Post |
| 46C | 1 | 342 | 20:43;25.256 | 20:45:35.021 | 00:02:09.765 | 641 | 4.9 | 00:00:03.766 | 00:00:02.703 |
| 07F | 1 | 343 | 20:45:37.724 | 20:46:04.036 | 00:00:26.312 | 94 | 3.5 | 00:00:02.703 | 00:00:04.667 |
| 46C | 1 | 344 | 20:46:08.723 | 20:47:14.550 | 00:01:05.827 | 238 | 3.6 | 00:00:04.687 | 00:00:02.421 |

```
[2020-06-20T20:46:03.614] 006348
[2020-06-20T20:46:03.739] 006350
[2020-06-20T20:46:03.833] 006354
[2020-06-20T20:46:03.927] 006360
[2020-06-20T20:46:04.020] 006364 ←Last
                                  RFID hit-07F
[2020-06-20T20:46:04.130] 006364
[2020-06-20T20:46:04.224] 006364
[2020-06-20T20:46:04.333] 006366
[2020-06-20T20:46:04.427] 006368
[2020-06-20T20:46:04.520] 006370
[2020-06-20T20:46:04.630] 006372
[2020-06-20T20:46:04.724] 006370
[2020-06-20T20:46:04.833] 006370
[2020-06-20T20:46:04.895] 006368
[2020-06-20T20:46:05.036] 006368
[2020-06-20T20:46:05.130] 006368
[2020-06-20T20:46:05.223] 006366
[2020-06-20T20:46:05.333] 006364
[2020-06-20T20:46:05.427] 006362
[2020-06-20T20:46:05.536] 006360
[2020-06-20T20:46:05.630] 006358
[2020-06-20T20:46:05.739] 006356
[2020-06-20T20:46:05.833] 006354
[2020-06-20T20:46:05.942] 006350
[2020-06-20T20:46:06.036] 006344
[2020-06-20T20:46:06.145] 006338
[2020-06-20T20:46:06.239] 006336
[2020-06-20T20:46:06.348] 006334
[2020-06-20T20:46:06.442] 006332
```

-continued

```
[2020-06-20T20:46:06.536] 006326
[2020-06-20T20:46:06.645] 006324
[2020-06-20T20:46:06.739] 006320
[2020-06-20T20:46:06.833] 006316
[2020-06-20T20:46:06.942] 006312
[2020-06-20T20:46:07.036] 006310 ←3
   second delay from last hit
[2020-06-20T20:46:07.145] 006310
[2020-06-20T20:46:07.239] 006310
[2020-06-20T20:46:07.348] 006306
[2020-06-20T20:46:07.442] 006304
[2020-06-20T20:46:07.552] 006304
[2020-06-20T20:46:07.645] 006304
[2020-06-20T20:46:07.739] 006304
[2020-06-20T20:46:07.848] 006302 ←scale
   equilibrium reached, 8/10's of second later
[2020-06-20T20:46:07.958] 006302
[2020-06-20T20:46:08.052] 006302
[2020-06-20T20:46:08.145] 006302
[2020-06-20T20:46:08.253] 006302
[2020-06-20T20:46:08.348] 006302
[2020-06-20T20:46:08.458] 006302
[2020-06-20T20:46:08.552] 006302
[2020-06-20T20:46:08.645] 006302
[2020-06-20T20:46:08.755} 006302 ←First
   RFID hit-46C
[2020-06-20T20:46:08.848] 006302
[2020-06-20T20:46:08.958] 006302
[2020-06-20T20:46:09.052] 006302
[2020-06-20T20:46:09.161] 006302
[2020-06-20T20:46:09.255] 006302
```

44 Tag/Start Weight Asynchrony and Negative Consumption

| Condition # | Flags | Requirement | |
|---|---|---|---|
| 1 | Feed Consumption | <0.00 kg | TRUE |
| 2 | Prior Weight Gap < Amount of Feed Consumption | | TRUE |
| 3 | Prior Time Gap | >4.0 seconds | TRUE |
| 4 | Duration | >1 second | TRUE |

Code if all conditions met: 44
Resolution: Reassign Start Weight with new "Adjusted Start Weight": Adjusted Start Weight = Start Weight – Prior Weight Gap
45 Quick Transition between two subsequent Feeding Sessions (<3.0 Interim Time Gap). Elevated Start weight to 2nd Feeding Session.

| Condition # | Flags | Requirement | |
|---|---|---|---|
| 1 | Feed Consumption | >0.00 kg | TRUE |
| 2 | Prior Weight Gap | >0.04 kg | TRUE |
| 3 | Prior Time Gap | <3.0 seconds | TRUE |
| 4 | Duration | >1 second | TRUE |

Notes: Elevated Start Weight for 2nd animal resulting from Scale still moving toward equilibrium based upon the influence of 1st animal.
Code if all conditions met: 45
Resolution: Reassign Start Weight with new "Adjusted Start Weight": Adjusted Start Weight = Start Weight – Prior Weight Gap
46 Quick Transition between two subsequent Feeding Sessions (<3.0 Interim Time Gap). Elevated Stop weight to 1st Feeding Session.

| Condition # | Flags | Requirement | |
|---|---|---|---|
| 1 | Feed Consumption | >0.00 kg | TRUE |
| 2 | Post Weight Gap | <−0.04 kg | TRUE |
| 3 | Post Time Gap | <3.0 seconds | TRUE |
| 4 | Duration | >1 second | TRUE |

Notes: Elevated Stop Weight for 1st animal resulting from Scale Weight increasing based upon the influence of 2nd animal.
Code if all conditions met: 46
Resolution: Reassign Stop Weight with new "Adjusted Stop Weight": Adjusted Stop Weight = Stop Weight + Post Weight Gap
51 Slight Negative Consumption-smoothing
As feed in the trough nears empty, and the animal visits the trough for a brief period of time, minor fluctuations in the scale can be captured giving the appearance of a negative consumption event. This code writes the consumption to zero.

-continued

| Condition # | Flags | Requirement | |
|---|---|---|---|
| 1 | Feed Consumption | <0.00 kg & > −0.12 kg | TRUE |
| 2 | Post Weight Gap > Amount of Feed Consumption | | TRUE |
| and/or 3 | Prior Weight Gap > Amount of Feed Consumption | | TRUE |
| 4 | Post Time Gap | >4.0 seconds | TRUE |
| 5 | Duration | >1 second | TRUE |

Code if all conditions met: 51
Resolution: Reassign new "Stop" Weight: Adjusted Stop Weight = Actual Start weight.
Consumption becomes "0.00"
The following are quality control Warnings provided by the program. No immediate action is taken. The program proceeds to a final review through the Step 5D Auditing process.
34 Backhit-A spurious tag read from an animal that is outside the typical tag read zone.
Not a feed consuming session.

| Condition # | Flags | Requirement | |
|---|---|---|---|
| 1 | RFID Total Hits | <10 | TRUE |
| 2 | Duration | <1 second | TRUE |

Code if all conditions met: 34
49 Code used to clear Error Code 99. This Feeding Session is adjacent to a Feeding Session with an anomaly (Codes 41/44/45/46/51/82/83), but otherwise Normal "0".
70 Rapid Transition (<1.0 second)

| Condition # | Flags | Requirement | |
|---|---|---|---|
| 1 | Prior Time Gap: | <1.0 second | TRUE |
| or 2 | Post Time Gap: | <1.0 second | TRUE |

Code if all conditions met: 70
Notes: V-gates prevent fast transitions between 2 animals into the system. This code is used during a test to monitor that the adjustable v-gate are on the correct setting.
101 Low tag hit count per second. Monitor tag for efficacy.

| Condition # | Flags | Requirement | |
|---|---|---|---|
| 1 | RFID Hits Per Second | <1.0 | TRUE |

Code if all conditions met: 101
Notes: Monitors tag health and alerts when a tag is not fully functionally.
102 > 30 second gap between hits within a feeding session

| Condition # | Flags | Requirement | |
|---|---|---|---|

Code if all conditions met: 102
Notes: Alerts when breaks of > 30 seconds within an Uninterrupted cluster of hits from the same animal. The animal left the system for a period of time and were the next animal to visit.
103 Duration less than 1.0 seconds

| Condition # | Flags | Requirement | |
|---|---|---|---|
| 6 | Duration | <1 second | TRUE |

Code if all conditions met: 103
Notes: Too brief of a system visit for consumption to occur.

44 Tag/Start Weight Asynchrony and Negative Consumption
Condition # Flags Requirement
  1 Feed Consumption <0.00 kg TRUE
  2 Prior Weight Gap <Amount of Feed Consumption TRUE
  3 Prior Time Gap >4.0 seconds TRUE
  4 Duration >1 second TRUE
Code if all conditions met: 44
  Resolution: Reassign Start Weight with new "Adjusted Start Weight": Adjusted Start Weight=Start Weight−Prior Weight Gap
45 Quick Transition between two subsequent Feeding Sessions (<3.0 Interim Time Gap).
  Elevated Start weight to 2nd Feeding Session.
Condition # Flags Requirement
  1 Feed Consumption >0.00 kg TRUE
  2 Prior Weight Gap >0.04 kg TRUE
  3 Prior Time Gap <3.0 seconds TRUE
  4 Duration >1 second TRUE
Notes: Elevated Start Weight for 2nd animal resulting from Scale still moving toward equilibrium based upon the influence of 1st animal.
Code if all conditions met: 45
  Resolution: Reassign Start Weight with new "Adjusted Start Weight": Adjusted Start Weight=Start Weight −Prior Weight Gap
46 Quick Transition between two subsequent Feeding Sessions (<3.0 Interim Time Gap).
  Elevated Stop weight to 1st Feeding Session.

Condition # Flags Requirement
  1 Feed Consumption >0.00 kg TRUE
  2 Post Weight Gap <−0.04 kg TRUE
  3 Post Time Gap <3.0 seconds TRUE
  4 Duration >1 second TRUE
Notes: Elevated Stop Weight for 1st animal resulting from Scale Weight increasing based upon the influence of 2nd animal.
Code if all conditions met: 46
Resolution: Reassign Stop Weight with new "Adjusted Stop Weight": Adjusted Stop Weight=Stop Weight+Post Weight Gap
51 Slight Negative Consumption-smoothing
As feed in the trough nears empty, and the animal visits the trough for a brief period of time, minor fluctuations in the scale can be captured giving the appearance of a negative consumption event. This code writes the consumption to zero.
Condition # Flags Requirement
  1 Feed Consumption <0.00 kg & >−0.12 kg TRUE
  2 Post Weight Gap >Amount of Feed Consumption TRUE and/or 3 Prior Weight Gap >Amount of Feed Consumption TRUE
  4 Post Time Gap >4.0 seconds TRUE
  5 Duration >1 second TRUE
Code if all conditions met: 51
Resolution: Reassign new "Stop" Weight: Adjusted Stop Weight=Actual Start weight.
Consumption becomes "0.00"

5C The following are quality control Warnings provided by the program. No immediate action is taken. The program proceeds to a final review through the Step 5D Auditing process.
  34 Backhit—A spurious tag read from an animal that is outside the typical tag read zone.
    Not a feed consuming session.
  Condition # Flags Requirement
  1 RFID Total Hits <10 TRUE
  2 Duration <1 second TRUE
  Code if all conditions met: 34
  49 Code used to clear Error Code 99. This Feeding Session is adjacent to a Feeding Session with an anomaly (Codes 41/44/45/46/51/82/83), but otherwise Normal "0".
  70 Rapid Transition (<1.0 second)
  Condition # Flags Requirement
  1 Prior Time Gap: <1.0 second TRUE
  or 2 Post Time Gap: <1.0 second TRUE
  Code if all conditions met: 70
  Notes: V-gates prevent fast transitions between 2 animals into the system. This code is used during a test to monitor that the adjustable v-gate are on the correct setting.
  101 Low tag hit count per second. Monitor tag for efficacy.
  Condition # Flags Requirement
  1 RFID Hits Per Second <1.0 TRUE
  Code if all conditions met: 101
  Notes: Monitors tag health and alerts when a tag is not fully functionally.
  102 >30 second gap between hits within a feeding session
  Condition # Flags Requirement
  Code if all conditions met: 102
  Notes: Alerts when breaks of >30 seconds within an Uninterrupted cluster of hits from the same animal. The animal left the system for a period of time and were the next animal to visit.
  103 Duration less than 1.0 seconds
  Condition # Flags Requirement
  6 Duration <1 second TRUE
  Code if all conditions met: 103
  Notes: Too brief of a system visit for consumption to occur.

5D Final Audit Review
  All prior error codes, warning codes, and unresolved Code 99's are reviewed with final auditing procedures. Additionally a random sampling of "0" normal feeding sessions are audited for quality control. There are three methods of audit. These can be used alone or in combination. 110 Scale Weight Log Review—scale log analysis to identify appropriate weight call
  The following describes the program process for identifying the true weight from the Scale weight log when an anomaly has occurred. This process can also be used as auditing procedure of the initial Start and Stop weight calls for "0" normal feeding sessions.
  Step 1 Beginning at the time corresponding to ½ second before the last RFID tag read of a feeding session, the program reviews the scale log calculating the average scale weight of this time along with the next 16 scale weight recordings (17 total weights)—further referred to as the "sliding window".
  Step 2 The program advances one weight record in time calculating the average of this and the next 16 records. The sliding window proceeds forward in chronological order until it has calculated the 17 weight average for 7.0 seconds, equivalent to 70 total scale weight records. Within this 7.0 second time period surrounding the time of the last RFID tag read, the program identifies the 17 weight—sliding window with the lowest total average weight. This is the target sliding window.
  Note:
    a.) 7.0 second window is shortened for two feeding sessions with a brief interim Time Gap.
    b.) If there are two or more sliding windows that return an equal average, the program chooses the window with the closest midpoint to 3.0 seconds after RFID stop.
  Step 3 Once the target sliding window is determined:
    With the 17 weights from the target sliding window, the program determines the frequency (mode) for each number. The program proceeds through in order from Cases A through C below, selecting the first positive result as the official "Stop" Weight of the feeding session.
      Case A If one weight occurs 9 times or greater, this weight is utilized as the "Stop" weight for the feeding session.
      Case B Two consecutive numbers (within 0.02 kg) appearing 9 times or greater. If this occurs, the number with the higher frequency becomes the "Stop" weight for the feeding session.
      Case C If Cases A and B are not met, the program calculates the average of the lowest nine weights. This becomes the "Stop" Weight of the feeding session.
  Step 4 If the Interim Time Gap with the next animal feeding session is within close proximity, the
    "Stop" weight identified above is also utilized as the "Start" weight of the second animal feeding session. If the Interim Time Gap is greater than a few seconds, a similar procedure to calculate the first animal "Stop" weight above is used to determine the "Start" weight for the next animal, using a similar methodology.

Notes:

When Stop and Start weights of adjacent feeding sessions are calculated independently using Code 110, if there is a discrepancy in the respective weights, the program will use Code 91, Code 85, or Code 120 to allocate the difference.

120 Behavioral Rate of Consumption Audit

What is Behavioral Rate of Consumption (BROC):

Over the course of an animal/feed testing period, hundreds and more specifically 2000-3000 feeding sessions are typically observed on a single animal. Each of these feeding sessions along with specific characteristics involved with the event (e.g. duration, type of feed, time of day, amount of trough competition with other animals, amount of feed remaining in the trough, etc.) are logged into the program database. With this data, a picture of the behavioral consumption patterns of the animal become clear, with distinguishable differences among animals. The BROC is utilized to predict the feed consumption of each induvial animal selected by the system user and can be used for all animals individually. The BROC can run on a cycle of 30 seconds, 1, 5, 10, 15, 20, 30, 45 or 55 minutes. The BROC can also run on a cycle of 1, 2, 4, 6, 8, 12, 16 or 24 hours.

Given the accuracy with which the hardware of this system captures precise animal presence in the system, BROC becomes a very useful predictor of feed consumption.

With this information, the program is now able to project and predict an animal's specific consumption, when duration/time is known and based upon previous behaviors. To remove bias, the program considers only the "0" normal feeding sessions that have no anomalies, and accounts for specific factors such as duration of the feeding session, type of feed, time of day, amount of trough competition with other animals, amount of feed remaining in the trough, etc.

Some general examples when BROC can be utilized

A general example in which BROC can be utilized would be a feeding session resulting in a negative consumption difference. While an infrequent occurrence, clearly there has been an anomaly. Basing the animal's actual consumption for this feeding session upon its documented behavioral patterns provides a more accurate estimation of the animal's consumption. Applying the animal's BROC×Duration provides this solution. Conversely, a feeding session may initially calculate that the animal consumed at an uncharacteristically high rate. For example, if animal 56B's BROC with a given set of variable is 0.20 kg/minute, but for this event the rate of consumption is 1.2 kg/minute, the consumption can be adjusted to better align with its BROC. The specific feeding session consumption can be normalized by the program, in alignment with well documented behavior patterns of the animal.

This method can be used in conjunction with the other Step 5D Auditing measures.

| Resolve Mid Weight Discrepancies-Allocates feed weight by Behavioral Rate of Consumption (BROC). | | | |
|---|---|---|---|
| Condition | #Flags | Requirement | |
| 1 | Feed Consumption | >0.00 kg | TRUE |
| 2 | either Post Weight Gap | >0.04 kg & < 20 kg | TRUE |
| | or | | |
| | Post Weight Gap | <−0.04 kg & > −20.0 kg | TRUE |
| 3 | Post Time Gap | >4.0 seconds | TRUE |
| 4 | Duration | >1 second | TRUE |
| 5 | Current Error Code | 99 | TRUE |

Notes:
The above 5 requirements are a sample set of conditions for illustrative purposes. These can be varied based upon the characteristics of the data to resolve various anomalies.

Code if all conditions met: 91

Resolution: Step 1: Calculate Total Consumption (both Feeding Sessions): Total consumption=Start weight of 1st SEQ–Stop weight of 2nd SEQ.

Step 2: Convert Durations to Integers.

Step 3: Calculate Individual Expected Consumption. Behavioral Rate of Consumption×Feeding Session Duration.

Step 4: Calculate Total Actual Consumption as a % of Total Expected Consumption.

Step 5: Multiple this factor by Individual Expected Consumption

Notes: Individual Behavioral Rate of Consumption (BROC) is derived only from "0" —Normal Feeding Sessions. These rates are accumulated daily in the database as the test progress.

Code 91 Calculation Example:
Code 91 Calculation Example:

| | | | | | | | | | | | | Weights | | | | |
|---|---|---|---|---|---|---|---|---|---|---|---|---|---|---|---|---|
| | | SEQ | | Times | | | RFID Hits | | Time Gaps | | | Kg | | | Gaps | |
| Tag | Bin | No. | Start | Stop (+3) | Duration | Total | Avg. | Prior | Post | Start | Stop | Diff | Rate | Prior | Post |
| 56A | 4 | 637 | 20:22:44.551 | 20:25:47.624 | 00:03:03.073 | 800 | 4.3 | 00:03:11.151 | 00:01:46.887 | 67.86 | 67.46 | 0.40 | 0.13 | 0.02 | 0.10 |
| 461 | 4 | 638 | 20:27:34.511 | 20:28:28.619 | 00:00:54.108 | 214 | 3.9 | 00:01:46.887 | 00:01:38.372 | 67.56 | 67.32 | 0.24 | 0.27 | 0.10 | 0.04 |

| Step 1 (67.86-67.32) Total Consumption (both animals) | Step 2 Convert Duration to an integer (minutes) | Animal's Behavorial ROC (from Database) | Step 3 (Step 2 × BROC) Individual Expected Consumption | Step 4 % of Actual Cons vs. Expected Cons | Step 5 % of Total Cons × Actual Cons | New Mid Wt. of the 2 Feeding Sessions |
|---|---|---|---|---|---|---|
| 0.54 | 3.05 | 0.14 | 0.43 | 101% | 0.43 | 67.43 |
|  | 0.90 | 0.12 | 0.11 | 101% | 0.11 |  |
| 0.54 Actual Consumption |  |  | 0.54 Expected Consumption |  | 0.54 Final allocation |  |

85 Final Waste Allocation
  After the program completes Step 5, any remaining unknown feed disappearance is attributed to Code 85—Waste. This is logged in the database and available for final reporting.
Step 6: Finalize Daily Station Reports
  After the program completes Steps 5A-5D, the consumption figures for each Feeding Session and Waste allocation are all finalized.
    The program provides a daily Final Station Report for each Station.
    All final data is entered into the database.
  Proceed to Step 7—"Final System Report".
Step 7: 24 Hour "Final System Report" (all Stations)
  Data from all "Final Station Reports" within the System are accumulated into one "Final System Report" per 24-hour period. The following are a few examples of the data analytics that can additionally be generated.
  Individual Animals
    Daily (24 hour) animal information
      Total Consumption per 24-hour period
      Number of Feeding Sessions
      Average Duration of Feeding Sessions
      Total Daily Duration of all Feeding Sessions
        Percentage of time at each trough
      Average Consumption per Feeding Session
      Average Time per Feeding Session
      Behavioral Consumption Rate/Minute
        For "0" Normal Feeding Sessions
        For non "0" Normal Feeding Sessions
        For all Feeding Sessions combined
      Alerts for consumption drops greater than 1 Standard Deviation
        Reduced consumption—unhealthy animal(s)
        Missing Tag
      Animals in the pen inventory but not present for a 24-hour period (tag lost/malfunctioning or sick)
    Dry Matter Conversion
    Daily individual animal RFID hits
      Monitor average RFID hit rate by animal to detect and replace low hit-count/defective tags (especially during warmup)
      Total RFID hits per station and for entire system
  Group
    Trough Management—Operator System Alerts
      Total Daily Feed dispensed
      Total Daily Consumption (All Feeding Sessions)
      Total Daily Waste
      If troughs were empty, for what duration?
      How much feed was remaining in the trough when feed was dispensed
      Graph Hourly Feed Disappearance—all troughs (to show pattern of consumption over 24-hour period)
    Animal/Tag Management—Operator System Alerts
      Animals that did not appear on a given day
      Animals with low read-rate tags (tags to replace) especially during system acclimation.
    Total 24-Hour Station Info
      Total Tag Hits by Station
      Number of Daily Feeding Sessions
      Average Duration of Feeding Sessions
      Total Duration of Feeding Sessions
      Average Consumption per Feeding Session
      Total Consumption per 24 hours
      Total Feed Disappearance not consumed by inventory animals (Waste)
        Cleanout by Operator
        Evaporation
        Feed Disappearance by Wildlife or non-RFID tagged cattle.
        Feed Disappearance by non-inventoried, RFID tagged animals.
        Other Waste
    Total 24 Hour System Info
      Total Tag Hits by Station
      Number of Daily Feeding Sessions
      Average Duration of Feeding Sessions
      Total Duration of Feeding Sessions
      Average Consumption per Feeding Session
      Total Consumption per 24 hours
      Behavioral Consumption Rate/Minute
      Total Feed Disappearance not consumed by inventory animals
        Cleanout by Operator
        Evaporation
        Wildlife or other cattle not on inventory
        Feed Waste
        Other-Waste
    Internal Audits and System Quality Control
      Monitor continuous logging—ensuring the system maintains electrical supply.
      Daily Check to make sure 864,000 +/− scale hits.
      Daily Check to confirm RFID hits and Scale Data are complete (on both sides of relogging startups).
      Compare scale weight at end of day to beginning weight for next day.
      Daily Anomaly report (by classification)
      Compare Total Feed Dispensed by operator vs All Accumulated Feeding Session Consumption+ Waste
Step 8: Test Period Final Analysis
  Accumulate all Daily "Final System Reports" into one "Test Period Final Analysis"
  Calculate all of the same information as Step 7, but for the entire Test Period
  In one embodiment of the instant invention, the computer/processor will automatically determine total daily consumption by animal and present this to a user in a visual format similar to a spreadsheet so that the rancher can easily monitor the overall feed consumption by his/her herd.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A feed intake system comprising
one or more feeding stations comprising:
   a trough with an animal feeding access;
   a base frame supporting the trough;
   a scale unit secured between the base frame and the trough to enable the scale unit to weigh contents of the trough;
   a station frame with an animal feeding access, the station frame located laterally next to the animal feeding access of the trough;
   a gate system secured to a front of the station frame, the gate system comprising:
      a first side gate secured to one side of the animal feeding access, the first gate being in a fixed position;
      one or more hinge ports are secured to the front of the station frame; a second side gate including a primary panel with one or more hinge pins secured to a first side of the primary panel, wherein the one or more hinge pins pivotally engage the one or more hinge ports secured to the front of the station frame; one or more hinge ports are secured to the primary panel; the second side gate further including a secondary panel with one or more hinge pins secured to a first side of the secondary panel and pivotally engaged with the one or more hinge ports on the primary panel, and a mounting mechanism
      secured to an opposite side of the secondary panel, and pivotally connected to the front of the station frame framing the animal feeding access with an adjustable width;
      wherein the first side gate and the second side gate emanate away from the station frame to create a channel to the animal feeding access;
   a sensor assembly including a sensor or antenna located near the station frame animal feeding access;
   a control panel and a timestamp generator operationally associated with the sensor assembly and the scale unit, the control panel obtaining and recording data obtained from the sensor assembly and the scale unit; and
   a CPU/processing computer operationally associated with the control panel for processing the recorded data;
one or more animals, each animal having an RFID/EID tag which transmits a unique RFID/EID signal and tag data associated with that animal;
   wherein a starting weight of a feed located within the trough at a starting timestamp generated by the timestamp generator is collected by the control panel and recorded within a log file;
   wherein additional weights of the feed located within the trough along with a timestamp generated by the timestamp generator are collected and recorded within the log file;
   wherein an ending weight of a feed located within the trough at an ending timestamp generated by the timestamp generator is collected by the control panel and recorded within a log file;
   wherein each unique RFID/EID signal and tag data are collected and recorded using the sensor assembly each time an animal puts its head through the station frame animal feeding access along with a timestamp generated by the timestamp generator and stored within the log file;
   wherein the data with the log file is processed using the computer/processing computer to correlate the time stamps and recorded feed weights from the log file with the time stamps and RFID/EID signal and tag data from the log file resulting in correlated data; and
   wherein a weight of the feed consumed and a duration that each animal spent eating is determined and calculated from the correlated data.

2. The feed intake system of claim 1 wherein the scale unit is comprised of:
   a lower mounting plate with a top and a bottom;
   one or more scale compression mounts with a top and a bottom, wherein each scale compression mount is secured by its bottom to the top of the lower mounting plate;
   one or more scale junction box(es) operationally associated with the one or more scale compression mount(s); and
   an upper mounting plate with a top and a bottom, wherein the upper mounting plate is secured by its bottom to the top of each scale compression mount;
      wherein the scale unit is mounted between the base frame and the support frame.

3. The feed intake system of claim 1 wherein the gate system creates a channel which is wide enough to allow only a single animal to enter and extend their head into the trough to consume feed and wherein the gate system creates a physical impediment that reduces the speed at which one animal exits the system and the next animal can enter the system creating a time delay between feeding events.

4. The feed intake system of claim 1 wherein either one or both the first side gate and the second side gate are adjustable to alter the width of the channel.

5. The feed intake system of claim 1 wherein the feed intake system is modular and mobile.

6. A feed intake system comprising
one or more feeding stations comprising:
   a trough with an animal feeding access;
   a support frame surrounding the trough;
   a base frame supporting the trough;
   a scale unit secured between the base frame and the support frame to enable the scale unit to weigh contents of the trough;

a station frame with an animal feeding access, the station frame located laterally next to the animal feeding access of the trough;
a gate system secured to a front of the station frame, the gate system comprising:
a first side gate secured to one side of the animal feeding access, the first gate being in a fixed position;
one or more hinge ports are secured to the front of the station frame; a second side gate including a primary panel with one or more hinge pins 98 secured to a first side of the primary panel, wherein the one or more hinge pins pivotally engage the one or more hinge ports secured to the front of the station frame; one or more hinge ports are secured to the primary panel; the second side gate further including a secondary panel with one or more hinge pins secured to a first side of the secondary panel and pivotally engaged with the one or more hinge ports on the primary panel, and a mounting mechanism
secured to the an opposite side of the secondary panel, and pivotally connected to the front of the station frame framing the animal feeding access with an adjustable width;
a sensor assembly including a sensor or antenna located near the station frame animal feeding access;
a control panel and a timestamp generator operationally associated with the sensor assembly and the scale unit, the control panel obtaining and recording data obtained from the sensor assembly and the scale unit; and
a CPU/processing computer operationally associated with the control panel for processing the recorded data;
one or more animals, each animal having an RFID/EID tag which transmits a unique RFID/EID signal and tag data associated with that animal;
wherein a starting weight of a feed located within the trough at a starting timestamp generated by the timestamp generator is collected by the control panel and recorded within a first log file;
wherein additional weights of the feed located within the trough along with a timestamp generated by the timestamp generator are collected and recorded within the first log file;
wherein an ending weight of a feed located within the trough at an ending timestamp generated by the timestamp generator is collected by the control panel and recorded within a first log file;
wherein each unique RFID/EID signal and tag data are collected and recorded using the sensor assembly each time an animal puts its head through the station frame animal feeding access along with a timestamp generated by the timestamp generator and stored within a second log file;
wherein the data with the first log file and the second log file is processed using the computer/processing computer to correlate the time stamps and recorded feed weights from the first log file with the time stamps and RFID/EID signal and tag data from the second log file resulting in correlated data; and
wherein a weight of the feed consumed and a duration that each animal spent eating is determined and calculated from the correlated data.

7. The feed intake system of claim 6 wherein the scale unit is comprised of:

a lower mounting plate with a top and a bottom;
one or more scale compression mounts with a top and a bottom, wherein each scale compression mount is secured by its bottom to the top of the lower mounting plate;
one or more scale junction box operationally associated with the one or more scale compression mounts; and
an upper mounting plate with a top and a bottom, wherein the upper mounting plate is secured by its bottom to the top of each scale compression mount;
wherein the scale unit is mounted between the base frame and the support frame.

8. The feed intake system of claim 6 wherein the gate system creates a channel which is wide enough to allow only a single animal to enter and extend their head into the trough to consume feed and wherein the gate system creates a physical impediment that reduces the speed at which one animal exits the system and the next animal can enter the system creating a time delay between feeding events.

9. The feed intake system of claim 6 wherein either one or both the first side gate and the second side gate are adjustable to alter the width of the channel.

10. The feed intake system of claim 6 wherein the feed intake system is modular and mobile.

11. The feed intake system of claim 6 wherein additional weights are collected by the control panel at least ten times per minute and recorded within the first log file.

12. The feed intake system of claim 1 wherein the system operates on a cycle duration of 1, 2, 4, 6, 8, 12, 16 or 24 hours.

13. A method for monitoring the feed intake of individual livestock animals comprising the steps of:
providing a feed intake system including one or more feeding stations comprising:
a trough with an animal feeding access;
a base frame supporting the trough;
a scale unit secured between the base frame and the trough to enable the scale unit to weigh contents of the trough;
a station frame with an animal feeding access, the station frame located laterally next to the animal feeding access of the trough;
a gate system secured to a front of the station frame, the gate system comprising:
a first side gate secured to one side of the animal feeding access, the first gate being in a fixed position;
one or more hinge ports are secured to the front of the station frame; a second side gate including a primary panel with one or more hinge pins secured to a first side of the primary panel, wherein the one or more hinge pins pivotally engage the one or more hinge ports secured to the front of the station frame; one or more hinge ports are secured to the primary panel; the second side gate further including a secondary panel with one or more hinge pins secured to a first side of the secondary panel and pivotally engaged with the one or more hinge ports on the primary panel, and a mounting mechanism
secured to an opposite side of the secondary panel, and pivotally connected to the front of the station frame framing the animal feeding access with an adjustable width;
a second side gate secured to an opposite side of the animal feeding access;

wherein the first side gate and the second side gate emanate away from the station frame to create a channel to the animal feeding access;

a sensor assembly including a sensor or antenna located near the station frame animal feeding access;

a control panel and a timestamp generator operationally associated with the sensor assembly and the scale unit, the control panel obtaining and recording data obtained from the sensor assembly and the scale unit; and a CPU/processing computer operationally associated with the control panel for processing the recorded data;

providing one or more animals, each animal having an RFID/EID tag which transmits a unique RFID/EID signal and tag data associated with that animal;

collecting and recording a starting weight of a feed located within the trough at a starting timestamp generated by the timestamp generator within a log file;

collecting and recording additional weights of the feed located within the trough along with a timestamp generated by the timestamp generator within the log file;

collecting and recording an ending weight of a feed located within the trough at an ending timestamp generated by the timestamp generator within a log file;

collecting and recording each unique RFID/EID signal and tag data with the sensor assembly each time an animal puts its head through the feed gate animal feeding access along with a timestamp generated by the timestamp generator within the log file;

processing the data with the log file with the computer/processing computer to correlate the time stamps and recorded feed weights from first log file with the time stamps and RFID signal and tag data from the second log file resulting in correlated data; and determining and calculating a weight of the feed consumed and a duration that each animal spent eating from the correlated data.

14. The method of claim 13 wherein collecting and recording the starting weight of feed located within the trough at a starting timestamp generated by the timestamp generator is recorded within a first log file;

collecting and recording additional weights of the feed located within the trough along with a timestamp generated by the timestamp generator within the first log file;

collecting and recording each unique RFID signal and tag data with the sensor assembly each time an animal puts its head through the feed gate animal feeding access along with a timestamp generated by the timestamp generator within a second log file;

collecting an ending weight of feed located within the trough by the control panel and generating an ending timestamp by the timestamp generator and recording within a first log file;

processing the data with the first log file and the second log file with the computer/processing computer to correlate the time stamps and recorded feed weights from the first log file with the time stamps and RFID signal and tag data from the second log file resulting in correlated data; and determining and calculating a weight of the feed consumed and a duration that each animal spent eating from the correlated data.

15. The method of claim 13 wherein a behavioral rate of consumption is measured and used to predict the feed consumption of one or more animals feeding from the feed intake system or feeding in a related system.

16. The method of claim 13 further comprising a software program being run by the CPU/processing computer to calculate, record and maintain a precise accounting of feed refills, relogging, feed waste and trough cleaning allocations, RFID/EID tag health, behavioral animal rate of consumption, feed consumption, or a combination thereof.

17. The method of claim 13 wherein the scale unit is comprised of:

a lower mounting plate with a top and a bottom;

one or more scale compression mounts with a top and a bottom, wherein each scale compression mount is secured by its bottom to the top of the lower mounting plate;

one or more scale junction box operationally associated with the one or more scale compression mounts; and an upper mounting plate with a top and a bottom, wherein the upper mounting plate is secured by its bottom to the top of each scale compression mount;

wherein the scale unit is mounted between the base frame and the support frame.

18. The method of claim 13 wherein the gate system creates a channel which is wide enough to allow only a single animal to enter and extend their head into the trough to consume feed and wherein the gate system creates a physical impediment that reduces the speed at which one animal exits the system and the next animal can enter the system creating separation between feeding events and allowing the scale to balance.

19. The method of claim 13 wherein either one or both the first side gate and the second side gate are adjustable to alter the width of the channel.

20. The method of claim 13 wherein the feed intake system is modular and mobile.

* * * * *